US010792612B2

(12) United States Patent
Corcoran et al.

(10) Patent No.: US 10,792,612 B2
(45) Date of Patent: Oct. 6, 2020

(54) METHODS AND COMPOSITIONS FOR THE REMOVAL OF MERCURY FROM GASES

(71) Applicant: University of Wyoming, Laramie, WY (US)

(72) Inventors: Robert C. Corcoran, Laramie, WY (US); Kaspars Krutkramelis, Laramie, WY (US); Rodolfo A. Monterroso, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 0 days.

(21) Appl. No.: 16/355,121

(22) Filed: Mar. 15, 2019

(65) Prior Publication Data
US 2019/0275462 A1 Sep. 12, 2019

Related U.S. Application Data

(63) Continuation-in-part of application No. 14/822,482, filed on Aug. 10, 2015, now abandoned.

(60) Provisional application No. 62/133,808, filed on Mar. 16, 2015.

(51) Int. Cl.
*C02F 1/76* (2006.01)
*B01D 53/64* (2006.01)
*B01J 20/32* (2006.01)
*B01D 53/83* (2006.01)
B01D 53/56 (2006.01)
B01D 53/52 (2006.01)
B01D 53/50 (2006.01)

(52) U.S. Cl.
CPC .............. *B01D 53/64* (2013.01); *B01D 53/83* (2013.01); *B01J 20/3236* (2013.01); *B01D 53/50* (2013.01); *B01D 53/52* (2013.01); *B01D 53/565* (2013.01); *B01D 2251/108* (2013.01); *B01D 2253/102* (2013.01); *B01D 2253/25* (2013.01); *B01D 2257/602* (2013.01); *F23J 2215/60* (2013.01)

(58) Field of Classification Search
None
See application file for complete search history.

(56) References Cited

U.S. PATENT DOCUMENTS

| 2,932,364 | A | * | 4/1960 | Binter | F01N 3/04 423/212 |
| 3,944,501 | A | * | 3/1976 | Whitehurst | B01J 20/22 502/401 |
| 7,217,401 | B2 | | 5/2007 | Ramme et al. | |
| 7,858,061 | B2 | | 12/2010 | Varma et al. | |
| 8,168,147 | B2 | | 5/2012 | Olson et al. | |
| 8,685,351 | B2 | | 4/2014 | Yang et al. | |
| 8,715,599 | B2 | | 5/2014 | Pollack et al. | |
| 8,728,974 | B2 | | 5/2014 | Yang et al. | |
| 9,017,452 | B2 | | 4/2015 | Hanson et al. | |
| 9,068,745 | B2 | | 6/2015 | Pollack et al. | |
| 9,295,984 | B2 | | 3/2016 | Alptekin | |
| 9,308,518 | B2 | | 4/2016 | Mimna et al. | |
| 2002/0169071 | A1 | | 11/2002 | Sauvage et al. | |
| 2004/0126308 | A1 | | 7/2004 | Choudhuri et al. | |
| 2009/0028767 | A1 | | 1/2009 | Parker et al. | |
| 2010/0061909 | A1 | * | 3/2010 | Kawamura | B01D 53/1456 423/243.02 |
| 2010/0151527 | A1 | | 6/2010 | Endo et al. | |
| 2011/0024680 | A1 | | 2/2011 | Via et al. | |
| 2011/0030592 | A1 | * | 2/2011 | Baldrey | C10L 9/10 110/342 |
| 2011/0081286 | A1 | | 4/2011 | Sasson et al. | |
| 2011/0215052 | A1 | | 9/2011 | Guzman Lucero et al. | |
| 2012/0090430 | A1 | | 4/2012 | Rogers et al. | |
| 2012/0100053 | A1 | * | 4/2012 | Durham | F23J 15/003 423/210 |
| 2012/0121485 | A1 | | 5/2012 | Rogers et al. | |

(Continued)

FOREIGN PATENT DOCUMENTS

GB 2463878 9/2008
WO WO 2012046057 4/2012

(Continued)

OTHER PUBLICATIONS

Abad-Valle et al. (Aug. 8, 2011) "Influence of iron species present in fly ashes on mercury retention and oxidation," Fuel. 90(8):2808-2811.
Abad-Valle et al. (Oct. 15, 2011) "The role of unburned carbon concentrates from fly ashes in the oxidation and retention of mercury," Chemical Engineering Journal. 174(1):86-92.
Avramoff et al. (1963) "The Brominating Properties of Tetramethylammonium Tribromide," J. Org. Chem. 28(11):3256-3258.
Berthelot et al. (1991) "A mild and efficient sonochemical bromination of alkenes using tetrabutylammonium tribromide," Tetrahedron Letters. 32(33):4135-4136.
Berthelot et al. (1995) "Action of tetrabutylammonium tribromide with para-substituted chalcones in protic and aprotic media," Can. J. Chem. 73:1526-1530.

(Continued)

*Primary Examiner* — Sheng H Davis
(74) *Attorney, Agent, or Firm* — Leydig, Voit & Mayer, Ltd.

(57) ABSTRACT

This invention relates to methods and compositions for removing contaminants from fluids, for example, the removal of mercury contaminants by oxidation. The compositions and methods provided herein are robust and accomplish efficient removal of contaminants from fluid streams without the need for relatively expensive activated carbon. In addition, the methods and compositions of the present invention do not pose risks to the safety of workers through the injection of highly toxic, highly corrosive elemental bromine to directly oxidize the mercury. The compositions and methods of the present invention are versatile and apply to a wide range of contaminants including, but not limited to, mercury, lead, cadmium, thallium, and hydrogen sulfides. Further, the compositions and methods contained herein are capable of efficient contaminant removal over a wide range of temperatures and pressures.

19 Claims, 15 Drawing Sheets

(56) References Cited

U.S. PATENT DOCUMENTS

| | | |
|---|---|---|
| 2012/0234766 A1 | 9/2012 | Siemer et al. |
| 2012/0282157 A1 | 11/2012 | Kusuura et al. |
| 2012/0308454 A1 | 12/2012 | Heuter et al. |
| 2014/0079612 A1 | 3/2014 | Krutka et al. |
| 2014/0224121 A1 | 8/2014 | Mimna et al. |
| 2014/0274667 A1 | 9/2014 | Alptekin |
| 2015/0239743 A1* | 8/2015 | Despen .................. C01B 32/366 210/694 |
| 2015/0265967 A1 | 9/2015 | Butz et al. |
| 2016/0271559 A1 | 9/2016 | Cocoran et al. |

FOREIGN PATENT DOCUMENTS

| | | |
|---|---|---|
| WO | WO 2014/077979 | 5/2014 |
| WO | WO 2014/164979 | 10/2014 |

OTHER PUBLICATIONS

Bhardwaj et al. (2009) "Impact of Fly Ash Composition on Mercury Speciation in Simulated Flue Gas," Journal of the Air and Waste Management Association. 59:1331-1338.

Budarin et al. (2004) "Chemical reactions of double bonds in activated carbon: microwave and bromination methods," Chem. Commun. pp. 2736-2737.

Chattaway et al. (1923) "LXXVIII. Perhalides of quaternary ammonium salts," J. Chem. Soc. 123(1):654-662.

Collado et al. (1991) "Nucleophilic 1,2 addition of bromine by perbromide reagents," Tetrahedron Letters. 32(27):3217-3220.

Ding et al. (Feb. 9, 2012) "Removal of Gas-Phase Elemental Mercury in Flue Gas by Inorganic Chemically Promoted Natural Mineral Sorbents," Ind. Eng. Chem. Res. 51(7):3039-3047.

Electric Power Research Institute (Aug. 2010) "Innovative technology simplifies carbon activation process, enabling on-site sorbent production for lower-cost control of mercury and other pollutants," Electric Power Research Institute. Accessible on the Internet at URL: http://mydocs.epri.com/docs/TI/1021633_Sorbent%20Activation_v3.pdf. [Last Accessed Oct. 13, 2015].

Forkenbrock (2001) "Comparison of external costs of rail and truck freight transportation," Transportation Research Part A. 35:321-327.

Fuente-Cuesta et al. (Dec. 1, 2012) "Retention of mercury by low-cost sorbents: Influence of flue gas composition and fly ash occurrence," Chemical Engineering Journal. 213:16-21.

Fusion Research (Nov. 26, 2013) "EPA Mercury Mandate Creates New $10 Billion Market," Seeking Alpha. Accessible on the Internet at URL: http://seekingalpha.com/article/1863811-epa-mercury-mandate-creates-new-10-billion-market. [Last Accessed Oct. 13, 2015].

Gopinath (Jun. 21, 2012) "Cabot bulks up specialty chemicals with Norit buy," Thomas Reuters. Accessible on the Internet at URL: http://www.reuters.com/article/2012/06/21/us-cabotcorp-noritnv-idUSBRE85K0L420120621. [Last Accessed Oct. 13, 2015].

Gopinath et al. (2002) "Tetrabutylammonium Tribromide (TBATB) as an Efficient Generator of HBr for an Efficient Chemoselective Reagent for Acetalization of Carbonyl Compounds," J. Org. Chem. 67(16):5842-5845.

Granite et al. (2000) "Novel Sorbents for Mercury Removal from Flue Gas," Ind. Eng. Chem. Res. 39:1020-1029.

Gu et al. (Jan. 29, 2015) "Evaluation of elemental mercury adsorption by fly ash modified with ammonium bromide," J. Therm. Anal. Calor. 119:1663-1672.

Hizny et al. (2013) "Demonstrations of MATS-Compliant Mercury Emissions Using BASF's Mercury Sorbent HX™," BASF Corporation: Catalysts Division. Iselin, New Jersey.

Hoffman et al. (Nov. 2003) "Preliminary Cost Estimate of Activated Carbon Injection for Controlling Mercury Emissions from an Un-Scrubbed 500 MW Coal-Fired Powerplant," U.S. Department of Energy. Accessible on an Internet archive at URL: https://web.archive.org/web/20130222092937/http://www.alrc.doe.gov/technologies/coalpower/ewr/mercury/pubs/ACI_Cost_Final.pdf. [Last Accessed Oct. 13, 2015].

Hwang et al. (2002) "Unburned Carbon from Fly Ash for Mercury Adsorption: I. Separation and Characterization of Unburned Carbon," Journal of Minerals and Materials Characterization and Engineering. 1(1):39-60.

Lei et al. (2008) Room Temperature Ionic Liquids for Mercury Capture from Flue gas: Ind. Eng. Chem. Res. 47, pp. 8396-8400.

Li et al. (Aug. 18, 2012) "Bench-Scale Studies on Capture of Mercury on Mineral Non-carbon Based Sorbents," Part III In; *Cleaner Combustion and Sustainable World*. Eds: Qi, Haiying; Zhao, Bo. Springer Berlin Heidelberg. pp. 347-353.

Li et al. (Sep. 10, 2013) "Experimental Research on Fly Ash Modified Adsorption of Mercury Removal Efficiency of Flue Gas," Advanced Materials Research. 800:132-138.

Liu et al. (May 15, 2013) "Synthesis, characterization, and mercury adsorption properties of hybrid mesoporous aluminosilicate sieve prepared with fly ash," Appl. Surf. Sci. 273(100):706-716.

Malm et al. (1994) "On the Bromination of the Three Isomeric Thieno(c)-Fused 1,5-Naphthyridines and Their 5-N-Oxides," Heterocycles. 37(1):331-345.

MarketsandMarkets (Nov. 2014) "Activated Carbon for Mercury Control Market worth $12,193.72 Million by 2019," MarketsandMarkets. Accessible on the Internet at URL: http://www.marketsandmarkets.com/PressReleases/activated-carbon-mercury-control.asp. [Last Accessed Oct. 13, 2015].

Papier et al. (1994) "XPS Study of the halogenation of carbon black-part 1. Bromination," Carbon. 32:1341-1358.

Papier et al. (1995) "XPS study of the halogenation of carbon black—Part 2. Chlorination," Carbon. 33:63-72.

Sasmaz et al. (May 7, 2012) "Mercury chemistry on brominated activated carbon," Fuel. 99:188-196.

Schaeffer (Jun. 2012) "The Activated Carbon Market 2012 Supply and Pricing Update or the Carbon Continuum," Water Conditioning and Purification. Accessible on an Internet archive at URL: https://web.archive.org/web/20141222181503/http://www.wcponline.com/pdf/1206Schaeffer.pdf. [Last Accessed Oct. 13, 2015].

Staley (Oct. 28, 2014) "Update: Cabot Norit Activated Carbon Awarded Two New Contracts for Mercury Removal," Benzinga. Accessible on the Internet at URL: http://www.benzinga.com/news/14/10/4957653/update-cabot-norit-activated-carbon-awarded-two-new-contracts-for-mercury-removal. [Last Accessed Oct. 13, 2015].

The Clean Air Technology Center (1999) "CATC Technical Bulletin—Choosing an Adsorption System for VOC: Carbon, Zeolite, or Polymers," U.S. Environmental Proection Agency. Doc. No. EPA-456/F-99-004. Accessible on the Internet at URL: http://www.epa.gov/ttn/catc/dir1/fadsorb.pdf. [Last Accessed Oct. 13, 2015].

Vidic et al. (2001) "Vapor-phase elemental mercury adsorption by activated carbon impregnated with chloride and chelating agents," Carbon. 39:3-14.

Westmoreland (Sep. 30, 2014) "Westmoreland and Cabot Corporation Announce Activated Carbon Capacity Expansion," Westmoreland Coal Company. Accessible on the Internet at URL: http://westmoreland.com/wp-content/uploads/2014/09/News409_Cabot-Activated-Carbon-Capacity-Expansion-09-30-2014.pdf. [Last Accessed Oct. 13, 2015].

Xu et al. (Feb. 1, 2013) "Mercury removal from coal combustion flue gas by modified fly ash," J. Environ. Sci. 25(2):393-398.

Yang et al. (Dec. 2, 2014) "Regenerable cobalt oxide loaded magnetosphere catalyst from fly ash for mercury removal in coal combustion flue gas," Environ Sci Technol. 48(24):14837-14843.

International Search Report with Written Opinion corresponding to International Patent Application No. PCT/US2015/044476, dated May 31, 2016.

\* cited by examiner

FIG. 7A           FIG. 7B

METHODS AND COMPOSITIONS FOR THE REMOVAL OF MERCURY FROM GASES

CROSS-REFERENCE TO RELATED APPLICATIONS

This application is a continuation-in-part of U.S. patent application Ser. No. 14/822,482 filed Aug. 10, 2015, which claims the benefit of and priority to U.S. Provisional Patent Application No. 62/133,808 filed Mar. 16, 2015, each of which is hereby incorporated by reference in its entirety.

STATEMENT REGARDING FEDERALLY SPONSORED RESEARCH OR DEVELOPMENT

This invention was made, at least in part, with United States governmental support awarded by the National Institutes of Health Grant No. 1R43ES024620-01 to Pollution Control Technology, LLC. The United States Government has certain rights in this invention.

BACKGROUND OF INVENTION

The present invention pertains to methods and compositions for the removal of contaminants, such as mercury. Aspects of the invention, for example, provide compositions and methods for the removal of elemental mercury from flue gases produced from the burning of carbonaceous materials.

A significant disadvantage to the burning of carbonaceous fuels, especially coal, lies with the emission of a variety of substances that are harmful to the environment (e.g., nitrogen and sulfur oxides) and substances that are directly harmful to humans. One of the best known examples of the latter is mercury. Mercury in all oxidation states is toxic to fish, birds, and mammals, but elemental mercury ($Hg^0$) is of particular concern, since it can be transformed to especially toxic organomercury compounds, e.g., methylmercury. Exacerbating the problem is the fact that while $Hg^{2+}$ and $Hg^{1+}$ salts are typically water soluble, and thus removable to some extent by passage of flue gases through aqueous ("wet") scrubbers, $Hg^0$ is not typically removed by such treatment. The threat posed by $Hg^0$ is sufficiently great that the United States government has, over the years, imposed increasingly stringent regulations having to do with how much mercury can be emitted by power plants, cement plants, and other entities burning mercury containing materials.

The need to limit mercury emissions to satisfy regulatory requirements has spawned a multi-billion dollar mercury capture industry. The most common method for decreasing mercury levels in flue gases is injection of activated carbon (AC), which removes mercury through various sorption pathways (e.g., physical adsorption, chemical adsorption) that depend on flue gas composition. With elemental mercury vapor entering the activated carbon matrix, mercury is removed principally by physical adsorption. This is non-ideal, since such adsorptive removal is most effective at low temperatures, and furthermore suffers the disadvantages of most adsorptive processes: competitive molecular adsorption and asymptotic sorption profiles that are strongly dependent on temperature and partial gas pressure. Thus, in practice, the amount of mercury removed from flue gas doesn't scale linearly with the amount of adsorbent injected, and to go from 75% mercury removal to 90% may require a very substantial increase in the amount of AC.

Fortunately, a variety of substances act synergistically with AC to increase the efficacy of mercury removal, shifting the process towards what is commonly termed chemical adsorption. For example, if the coal being burned has a relatively high halide concentration, the performance of the AC is markedly improved. Alternatively, mercury removal is greatly enhanced through use of halide-impregnated activated carbons [1]. Qualitatively similar Hg-capture performance effects are seen with co-adsorbed sulfur or anionic oxygen species [2].

The details of the above described mercury capture processes are not completely understood even to this day. While varying degrees of AC treatment success have been reported with a variety of alkali metal and transition metal chlorides and bromides, the most commonly employed halide is almost certainly bromide. While bromide alone may be effective in mercury removal if applied to coal prior to combustion, it seems that the presence of the AC (in conjunction with bromide) is critical in the lower temperature, lower oxygen atmosphere found post-combustion, where mercury removal has most commonly been implemented.

One modification of AC potentially beneficial for the removal of mercury from flue gas is brominated activated carbon. AC can be brominated by treating it with solvents containing free bromine, or by exposing it directly to bromine vapors. The results of these treatments may vary to some extent depending on the treatment method and temperature/pressure conditions used. In the application of bromination procedures to AC, part of the bromine is adsorbed to the surface of the carbon, and may be spontaneously lost by simple sorbent heating, causing evaporation. Some bromine may migrate and comingle into the pore structure of the carbon, where it is less easily lost (though possibly less available for interaction with mercury or other gas phase compounds). However, a major mode of bromine fixation to carbon appears to be chemical reactions to give bromine attached to $sp^3$ and $sp^2$ hybridized carbons [2-4]. It seems possible that such reactions occur from reaction of bromine with alkenes to give vicinal-dibromides [5], or with aromatic rings to give aromatic bromides and hydrogen bromide (HBr) [3,4]. The former process appears to occur readily at ambient temperatures to give a stable brominated AC that can react with a variety of nucleophiles to give functionalized ACs. Insofar as vicinal dibromides can be debrominated by "soft" nucleophiles such as iodide ("soft" in the context of hard-soft acid/base theory), it is not implausible that they could similarly be debrominated by the soft mercury, with concomitant oxidation. If/when bromination of aromatic rings in carbon sources occurs, electrophilic aromatic substitution to give aryl bromides will be accompanied by production of HBr, the presence of which may be potentially inferred [3,4]. This is undesirable, since heating such brominated carbons may lead to loss of the putative HBr, which may be responsible in part for corrosion of the plant equipment (e.g., duct work) or any other systems using brominated activated carbons.

One can potentially by-pass the use of the costly activated carbon used as an oxidation mediator in these processes and directly oxidize mercury vapor in the flue gas by simply injecting bromine gas. The reaction of mercury with bromine gas is chemically straightforward, since the oxidation potential of bromine is more than sufficient to potentially accomplish the irreversible conversion of mercury to $HgBr_2$. However, bromine is extraordinarily toxic and corrosive, which makes this method hazardous to plant operators and damaging to equipment.

Activated carbons have also been modified by other compounds, such as thiols, heterocyclic amines and aromatics attached via spacers to amines that serve as binding agents [6]. While some of these compositions may show dynamic Hg⁰ adsorption at low temperatures, they show poor performance for the elevated temperatures that are typically encountered in an actual post-furnace exhaust environment.

Activated carbon, and especially modified activated carbons, are expensive. For example, in the United States it is not unusual to have costs in the $1,000-2,000/ton range for the material itself, along with substantial shipping charges. In view of these high costs, a particularly attractive candidate for an alternate to such a material is fly ash (FA), which is the ash that is produced as a combustion by-product in coal combustion furnaces. This material often has "negative value" in the sense that it may be necessary for the power/heat producer to pay to have the material removed from the site of production. In addition, FA has a small particle size and relatively high surface area. However, conventional FA technology has not reached the mercury removal efficiency achieved by using activated carbon. Thus far, native FA has shown unimpressive mercury removal ability, as has FA treated with a variety of halides and anionic oxygen species.

Other such mediations of oxidizing events may occur through the formation of surfaces comprising a variety of transition metal halides/sulfates, as is disclosed in Varma et al. (U.S. Pat. No. 7,858,061 B2) [7]. As is the case for AC and brominated AC, the nature of mercury oxidizing event is unclear. While the metals used have redox potentials such that reaction with elemental mercury would be expected to be unfavorable, it is possible that those potentials could be perturbed by the presence of the AC or of the other surfaces employed. It is also possible that at the relatively high temperatures at which the mercury removal is occurring, the metal may mediate the process by undergoing reduction by mercury in a somewhat thermodynamically unfavorable process. If the resulting metal species were susceptible to air oxidation, then that process would drive the overall equilibrium. Thus:

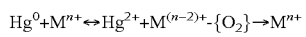

$$Hg^0 + M^{n+} \leftrightarrow Hg^{2+} + M^{(n-2)+} \cdot \{O_2\} \rightarrow M^{n+}$$

If some hypothetical $M^{(n-2)+}$ species was more kinetically susceptible to air oxidation than Hg⁰, then even with a relatively unfavorable redox reaction between Hg⁰ and $M^{n+}$ the reaction could be driven to completion. While processes such as this are in occasional use, they may not be as reliable as desired. On a chemical basis, they may suffer from undesirable kinetics associated with the somewhat complex process by which the overall metal mediated oxidation event occurs.

It will be appreciated from the foregoing that there is currently a need in the art for improved compositions and methods for efficient yet inexpensive removal of contaminants, such as mercury, from fluids using materials other than activated carbon. For example, compositions and methods utilizing abundant, inexpensive or negative cost materials, such as fly ash for the removal of contaminants from flue gases generated by the burning of carbonaceous materials.

SUMMARY OF THE INVENTION

This invention relates to methods and compositions for removing contaminants from fluids, for example, the removal of mercury contaminants by oxidation. The compositions and methods provided herein are robust and accomplish efficient removal of contaminants from fluid streams without the need for relatively expensive activated carbon. In addition, the methods and compositions of the present invention do not pose risks to the safety of workers through the injection of highly toxic, highly corrosive elemental bromine to directly oxidize the mercury. The compositions and methods of the present invention are versatile and apply to a wide range of contaminants including, but not limited to, mercury, lead, cadmium, thallium, and hydrogen sulfides. Further, the compositions and methods contained herein are capable of efficient contaminant removal over a wide range of temperatures and pressures.

Provided herein are compositions and methods that utilize a trihalide salt deposited on a substrate having a high surface area that can be injected into, and/or blown into, and/or otherwise suspended in a condensed and/or gaseous fluid, and/or which can be configured in such a way that the fluid passes through it whereby contaminants, such as elemental mercury, in the fluid are contacted with the trihalide salt. As used in this invention, a fluid is a substance that flows, has no fixed shape, and which yields to an applied pressure. Fluids may be condensed, as in liquids, and/or in gaseous states. Further, a fluid comprises an exhaust gas, source gas and/or process gas. In some embodiments, the trihalide salt oxidizes the contaminant. In one embodiment, the invention provides novel and efficient methods and compositions for the removal of elemental mercury from flue gases by oxidizing elemental mercury to mercury salts ($Hg^{1+}$ and $Hg^{2+}$) which are soluble in water and/or organic solvents. The present invention includes embodiments in which the trihalide salt is an ammonium trihalide, such as a quaternary ammonium trihalide, as well as embodiments in which the ammonium moiety of the ammonium trihalide includes one or more N—H bonds. The present invention also includes embodiments in which a readily available substantially unreactive, finely divided substrate is further modified by pre-deposition of a halide salt by contacting it with a solution of that salt before, during, and/or after ammonium trihalide deposition. In some embodiments, the present invention involves the removal of elemental mercury from flue gases produced in a power plant and/or some other furnace burning coal and/or other carbonaceous materials. Other embodiments of this invention include the removal of mercury from other gaseous sources, for example, including, but not limited to "natural gas," and may also include removal of toxic species other than mercury, such as lead, cadmium, thallium, hydrogen sulfides and other readily oxidizable compounds, whether such removal is accomplished at low temperatures or high.

In contrast to conventional methods for removing mercury from the exhaust and/or flue gases of power/heat generating furnaces, the present invention does not rely on the unique characteristics of relatively expensive activated carbon and/or its modifications to mediate oxidation reactions in pores on its surface. Instead, the principles of some embodiments of the present invention rely on the combination of three different things: (1) the low cost, relatively available ash (commonly, "fly ash") that is produced in a power/heat generating furnace that can serve as a substrate (i.e., a solid support) for an active mercury removing agent, (2) the direct, kinetically uncomplicated oxidizing effects of elemental bromine, and (3) a method for providing that direct oxidizing effect of elemental bromine without using bromine liquid or gas itself, by depositing ammonium tribromides (also known as ammonium perbromides) that comprise a relatively stable source of what is, in effect, a solid equivalent for bromine that is more readily and safely handled than bromine itself.

Fly ash is "naturally" produced as a fine powder having a relatively large surface area. Insofar as fly ash is produced, virtually by definition, in conditions that are highly oxidizing, it will be stable to most oxidizing agents. These characteristics, of being stable with respect to oxidation, and of being available on-site as a fine powder having a relatively large surface area, make fly ash a particularly appropriate component of the principle embodiments of this invention, since it makes possible the distribution of the mercury oxidizing component of the invention, an ammonium tribromide that serves as a solid substitute for volatile bromine, over a very large surface area such that it can effectively be contacted by mercury vapor in a gas phase and oxidize it.

In an aspect of the current invention, a process for removal of contaminants in a fluid is provided. The process comprising the steps of: contacting said contaminants in said fluid with a trihalide salt provided on a substrate; wherein said trihalide salt comprises a trihalide anion and cationic nitrogen counter ion, thereby generating one or more reaction products resulting in removal of said contaminants in said fluid. In an embodiment, the trihalide salt is an oxidation agent and one or more reaction products are oxidation products. In an embodiment, the one or more reaction products and contaminants are deposited on said substrate. In an embodiment, the contaminants comprise oxidized mercury in the +1 oxidation state, and/or oxidized mercury in the +2 oxidation state. In an embodiment, the oxidation products are formed in the gas phase. In an embodiment, the fluid comprises an exhaust gas, source gas and/or process gas.

In embodiments of the process for removal of contaminants in a fluid, the contaminant is elemental mercury ($Hg^0$). In an embodiment, the one or more oxidation products comprise $Hg^{2+}$ and/or $Hg^{1+}$ In an embodiment, the one or more oxidation products are mercury salts in which the mercury is in the +2 and/or +1 oxidation state. In an embodiment, the process further comprising a step of removing said $Hg^{2+}$ and/or $Hg^{1+}$ oxidation products and contaminants from said substrate by treatment of said substrate with an organic and/or a halogenated hydrocarbon solvent. In an embodiment, the process further comprising a step of removing said $Hg^{2+}$ and/or $Hg^{1+}$ from the substrate by collecting the substrate, passing an organic and/or halogenated hydrocarbon solvent through it, and evaporating the organic and/or halogenated hydrocarbon solvent to collect the $Hg^{2+}$ and $Hg^{1+}$ salts.

In embodiments of the process for removal of contaminants in a fluid, and/or a process for producing a material for the removal of mercury from a gas, the trihalide anion has the formula (FX1):

$$[X^1-X^2-X^3]^-  \quad (FX1);$$

wherein each of $X^1$, $X^2$, and $X^3$ is independently Br, Cl, F or I.

In an embodiment, the process wherein each of $X^1$, $X^2$, and $X^3$ is Br and/or Cl.

In an embodiment of the process for removal of contaminants in a fluid, and/or a process for producing a material for the removal of mercury from a gas, the trihalide anion has the formula: [Br—Br—Br]⁻, [Br—Br—Cl]⁻, [Br—Br—I]⁻ or [Br—I—I]⁻. In an embodiment, the trihalide anion has the formula [Br—I—I]⁻. In an embodiment, the cationic nitrogen counter ion is an ammonium cation. In an embodiment, the d ammonium cation is characterized by one or more N—H bonds. In an embodiment, the ammonium cation is a quaternary ammonium cation. In an embodiment, the ammonium cation is a quarternary alkylammonium cation. In another embodiment, the cationic nitrogen counter ion comprises a heterocyclic nitrogen containing group. In an embodiment, the heterocyclic nitrogen containing group is a heterocyclic aromatic group and/or a heteroalicyclic group. In an embodiment, the heterocyclic nitrogen containing group is a pyridinium, quinolinium, isoquinolinium and/or imidazolium group.

In embodiments of the process for removal of contaminants in a fluid, and/or a process for producing a material for the removal of mercury from a gas, the cationic nitrogen counter ion has the formula (FX2) or (FX3):

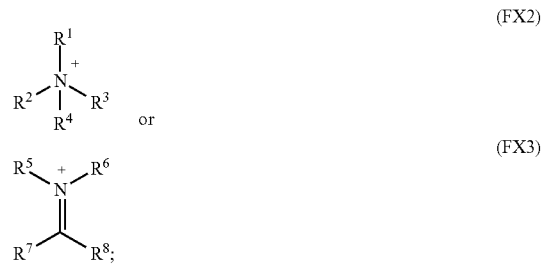

(FX2)

or (FX3)

wherein each of $R^1$, $R^2$, $R^3$, $R^4$, $R^5$, $R^6$, $R^7$ and $R^8$ is independently hydrogen, $C_1$-$C_{20}$ alkyl, $C_3$-$C_{20}$ cycloalkyl, $C_5$-$C_{30}$ aryl, $C_5$-$C_{30}$ heteroaryl, $C_5$-$C_{20}$ alkylaryl or $C_5$-$C_{20}$ arylalkyl, or wherein any of $R^1$, $R^2$, $R^3$, $R^4$, $R^5$, $R^6$, $R^7$, or $R^8$ together with the atoms to which they are attached combine to form one or more carbocyclic or heterocyclic 4, 5, 6, 7, 8 or 9 membered rings.

The cationic nitrogen counter ion may have the formula (FX4):

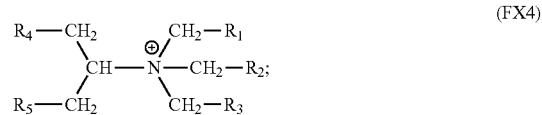

(FX4)

wherein each wherein each of $R^1$, $R^2$, $R^3$, $R^4$ and $R^5$ is independently hydrogen, $C_1$-$C_{20}$ alkyl or $C_3$-$C_{20}$ cycloalkyl. Each of $R^1$, $R^2$, $R^3$ may be independently hydrogen or a $C_1$-$C_5$ alkyl; and each of $R^4$ and $R^5$ may be independently hydrogen or a $C_1$-$C_4$ alkyl.

In embodiments of the process for removal of contaminants in a fluid, and/or a process for producing a material for the removal of mercury from a gas, the trihalide salt is an ammonium trihalide salt comprising at least one of: a tetramethylammonium tribromide, tetraethylammonium tribromide, tetrapropylammonium tribromide, tetrabutylammonium tribromide, tetrapentylammonium tribromide, tetrahexylammonium tribromide, tetraheptylammonium tribromide, pyridinium tribromide, n-butylpyridinium tribromide, quinolinium tribromide, isoquinolinium tribromide and/or an imidazolium tribromide.

In embodiments of the process for removal of contaminants in a fluid, and/or a process for producing a material for the removal of mercury from a gas, the ammonium trihalide salt is sorbed on a surface of said substrate. In an embodiment, the substrate exhibits a surface area per unit volume selected over the range of 0.1 m²/g to 8000 m²/g. In an embodiment, the substrate is substantially unreactive with respect to said trihalide salt. In an embodiment, the substrate is not activated carbon. In an embodiment, the substrate comprises particles and/or fibers. In an embodiment, the particles have an average cross sectional dimensions less than or equal to 500 mm. In an embodiment, the particles have cross sectional dimensions selected over the range of 0.1 µm to 500 mm. In an embodiment, the particles are provided in a packed channel, wherein said step of contacting occurs by flowing said fluid through said packed channel. In an embodiment, the particles have an average cross sectional dimension less than or equal to 5 cm.

In embodiments of the process for removal of contaminants in a fluid, and/or a process for producing a material for the removal of mercury from a gas, the fibers have a cross sectional dimensions selected over the range of 0.1 µm to 100 µm. In an embodiment, the fibers have a length in the range of 0.9 µm to 50 cm. In an embodiment, the fibers are provided in a packed channel, wherein said step of contacting occurs by flowing said fluid through said packed channel.

In embodiments of the process for removal of contaminants in a fluid, and/or a process for producing a material for the removal of mercury from a gas, the substrate is selected from the group consisting of: fly ash, particle ash, Portland cement, pozzolan, volcanic ash, energetically modified cement, silica fume, clay, talc, talcum powder, gypsum, gypsum powder, montmorillonite, bentonite, sand, rock wool, mineral wool, glass wool, ceramic wool, fiberglass and any combination of these. In an embodiment, the substrate is fly ash. In an embodiment, the substrate is an industrial byproduct. In an embodiment, the substrate contains less than 69% carbon by mass.

In embodiments of the process for removal of contaminants in a fluid, and/or a process for producing a material for the removal of mercury from a gas, the trihalide salt is provided at a concentration selected from the range of 0.1% to 30%. In an embodiment, the trihalide salt is provided at a concentration selected from the range of 0.3% to 10%. In an embodiment, the process is carried out at a temperature selected from the range of 273 K to 800 K, at a temperature selected from 273 K to 473 K, or optionally, at a temperature selected from 293 K to 313 K. In an embodiment of the process for removal of contaminants in a fluid, the contacting step comprises injecting and/or blowing said trihalide salt provided on a substrate into said fluid and/or blowing said trihalide salt provided on a substrate into said fluid.

In embodiments of the process for removal of contaminants in a fluid, the contaminant is elemental mercury ($Hg^0$), lead, thallium, cadmium, uranium, hafnium, beryllium, hydrogen sulfide, mercaptan, or any combination of these. In an embodiment, the contaminant is a nitrogen oxide compound. In an embodiment, the said contaminant is NO.

In embodiments of the process for removal of contaminants in a fluid, the fluid is a flue gas from a power plant and said contaminant is elemental mercury ($Hg^0$). In an embodiment, the fluid is natural gas and said contaminant is elemental mercury ($Hg^0$), hydrogen sulfide, one or more mercaptans, or any combination of these. In an embodiment, the substrate comprises a substrate that has additionally been modified by deposition of a halide salt, said halide salt being chosen from fluoride, chloride, bromide and/or iodide combined with a counterion chosen from lithium, sodium, potassium, calcium, and/or ammonium and/or quaternary ammonium.

In an aspect of the current invention, a process for producing a material for the removal of mercury from a gas is provided. The process comprising the steps of: providing a substrate; and contacting said substrate with a trihalide salt comprising a trihalide anion and cationic nitrogen counter ion; wherein said substrate is selected from the group comprising: fly ash, particle ash, Portland cement, pozzolan, volcanic ash, energetically modified cement, silica fume, clay, talc, talcum powder, gypsum, gypsum powder, montmorillonite, bentonite, sand, rock wool, mineral wool, glass wool, ceramic wool, fiberglass and any combination of these.

In embodiments of the process for producing a material for the removal of mercury from a gas where the trihalide, or perhailde is provided in a solvent, it may be beneficial to remove the solvent after processing the trihalide, or the substrate, or both. In an embodiment, the trihalide salt is provided as a solution comprising an organic solvent and/or halogenated hydrocarbon solvent. In an embodiment, the process further comprising the step of evaporating said organic solvent and/or halogenated hydrocarbon solvent. In an embodiment, the evaporation of said organic solvent is performed at a pressure less than atmospheric pressure. In an embodiment, the evaporation of said organic solvent is performed at a temperature greater than room temperature.

In embodiments of the process for producing a material for the removal of mercury from a gas, the contacting step comprises spraying an aerosol of the solution onto the substrate undergoing active mixing. In an embodiment, the solvent is ethyl formate, chloroform, dichloromethane or a combination of these. In an embodiment, the contacting step comprises mixing powdered, solid trihalide with the substrate. In an embodiment, the process further comprising adding an organic and/or halogenated hydrocarbon solvent to moisten the substrate.

In embodiments of the process for producing a material for the removal of mercury from a gas, the process further comprising heating the substrate.

In embodiments of the process for producing a material for the removal of mercury from a gas, the trihalide forms a coating on at least a portion of said substrate. In an embodiment, the process wherein said substrate is not contacted with water.

In an aspect, the invention provides a process for removal of contaminants in a fluid, the process comprising the steps of: contacting the contaminants in the fluid with a trihalide salt provided on a substrate; wherein the trihalide salt comprises a trihalide anion and cationic nitrogen counter ion, thereby resulting in removal of the contaminants in the fluid. In an embodiment of this aspect, the contaminants are removed via a sorptive process, a reactive process or combination of reactive and sorptive processes. In an embodiment of this aspect, the contaminants comprise oxidized mercury in the +1 oxidation state, and/or oxidized mercury in the +2 oxidation state. In an embodiment of this aspect, the contaminants comprise elemental mercury) ($Hg^0$).

In an aspect, provided is a process for removal of contaminants in a fluid, said process comprising the steps of: contacting said contaminants in said fluid with a trihalide salt provided on a fiber substrate; wherein said trihalide salt comprises an oxidizing trihalide anion and cationic nitrogen counter ion; wherein said trihalide anion has the formula [Br—I—I]$^-$; and wherein the trihalide anion oxidizes said contaminants, thereby generating one or more reaction products resulting in removal of said contaminants in said fluid.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 7A. shows the capacities obtained at different fractions of the breakthrough readings (i.e., 50%, 75%, 90%) FIG. 7B. shows the capacities obtained at different times (i.e., 10 min, 30 min, 60 min, 120 min, 180 min) after the sorption experiment start. Capacities increase with increasing loadings of TBAT. However, both from FIG. 7A. and 7B, the difference in the capacities exhibited by different loadings, increases with increasing breakthrough concentration and time. This is indicative that during the first few minutes of the adsorption experiment there are no substantial differences between different loadings; the relevance of this result relies in the fact that one of the most common mercury removal processes utilized at coal-fired burner facilities, i.e. an "in-flight" process, allows for only few seconds of contact time, thus an enhancement in the mercury removal capacity that takes place over extended periods of time might not necessarily yield a higher efficiency in the overall mercury removal performance.

DETAILED DESCRIPTION OF THE INVENTION

Figure 1:
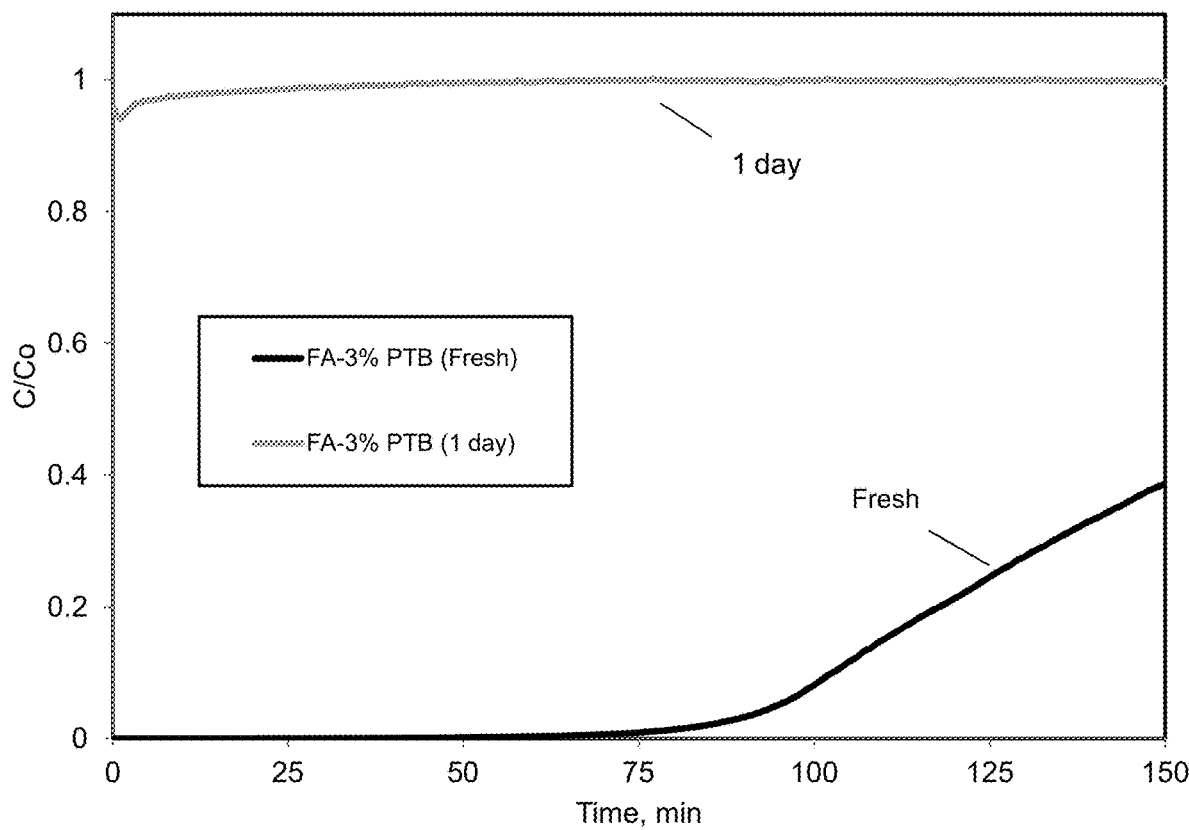
FIG. 1. Mercury breakthrough curves for freshly prepared and aged compositions comprising pyridinium tribromide (PTB) on fly ash, illustrating loss of activity upon aging. Mercury breakthrough curves are shown for a 3% PTB activated FA sorbent sample (FA obtained from Dry Fork Station, refer to preparation steps in Example 1). The breakthrough curve in black shows the freshly activated/prepared fly ash sample Hg sorption potential (calculated Hg capacity of ~2000 µg/g). The breakthrough curve in light gray, exhibits the performance of the same sample a day later with almost no Hg sorption capacity (calculated Hg capacity of ~20 µg/g).

In general, the terms and phrases used herein have their art-recognized meaning, which can be found by reference to standard texts, journal references and contexts known to those skilled in the art. The following definitions are provided to clarify their specific use in the context of the invention.

Fluid.

A fluid is a substance that flows, has no fixed shape, and which yields to an applied pressure. Fluids may be condensed, as in liquids, and/or in gaseous states. A fluid comprises an exhaust gas, source gas and/or process gas.

Trihalide or Perhalide.

Trihalide and perhalide refer to an anion having three halogens in the form $[X^1—X^2—X^3]^-$ wherein $X^1$, $X^2$, and $X^3$ are independently chosen from Br, Cl, and (less commonly) F and I.

Fly Ash.

Fly ash, also known as "ash," and/or "flue ash" is the light, airborne (hence the "fly") ash that rises with the flue gases produced in the combustion of carbonaceous materials, most commonly coal. The composition of the ash may vary depending on the nature of the material being burned, but it is usually composed of a variety of oxides, including but not limited to those of silicon and calcium, along with a wide and varying amounts of trace metal oxides and salts. Depending on combustion efficiency, fly ash may contain varying amounts of carbon residues.

Substrate.

Also referred to as "solid support," this is a finely divided, substantially unreactive material having a high surface area. In most embodiments of the present invention it will not be intended to serve any chemical role in the removal of mercury, but rather will serve as a means by which the oxidizing trihalide may be dispersed over as wide a surface area as practically feasible, thereby promoting the greatest degree of contact with mercury containing gas and facilitating rapid and efficient oxidation.

Substrate Modifier.

Substrate modifiers comprise substances, typically alkali metal halides, that may influence the characteristics of the trihalide in terms of its stability in the mercury-removing composition, its kinetics of oxidation of mercury at various temperatures, and the overall activity of the composition with respect to time.

Sorbed.

Sorbed refers to the chemical and/or physical association of two or more materials to one another via physical and/or chemical processes, such as the bonding and/or other associative interactions of ions and/or molecules to the surface of another substance. As used herein, sorbed is inclusive of materials that have been adsorbed, absorbed, physorbed and/or chemisorbed. The term "sorptive process" refers to a process wherein one or more materials, such as contaminants or reaction products, are sorbed.

Room Temperature.

Room temperature as used herein refers to the temperature selected from the range of 15° C. to 30° C., or optionally, 20° C. to 25° C., unless otherwise specified.

Alkyl Groups.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. Cyclic alkyl groups include those having one or more rings. Cyclic alkyl groups include those having a 3-, 4-, 5-, 6-, 7-, 8-, 9- or 10-member carbon ring and particularly those having a 3-, 4-, 5-, 6-, or 7-member ring. The carbon rings in cyclic alkyl groups can also carry alkyl groups. Cyclic alkyl groups can include bicyclic and tricyclic alkyl groups. Alkyl groups are optionally substituted. Substituted alkyl groups include, among others, those which are substituted with aryl groups, which in turn can be optionally substituted. Specific alkyl groups include methyl, ethyl, n-propyl, iso-propyl, cyclopropyl, n-butyl, s-butyl, t-butyl, i-butyl, cyclobutyl, n-pentyl, branched-pentyl, cyclopentyl, n-hexyl, branched hexyl, and cyclohexyl groups, all of which are optionally substituted.

Alkenyl Groups.

Alkenyl groups include pairings of $sp^2$ hybridized carbons in the form C=C, but do not include both of these carbon atoms as part of an aromatic ring. The two carbons of the alkene can be substituted in a fashion similar to that described above for alkyl groups.

Aryl Groups.

Aryl groups include groups having one or more 5- or 6-member aromatic or heteroaromatic rings. Aryl groups can contain one or more fused aromatic rings. Heteroaromatic rings can include one or more N, O, or S atoms in the ring. Heteroaromatic rings can include those with one, two or three N, those with one or two O, and those with one or two S, or combinations of one or two or three N, O or S. Aryl groups are optionally substituted. Substituted aryl groups include among others those which are substituted with alkyl and/or alkenyl groups, which groups in turn can be optionally substituted. Specific aryl groups include phenyl groups, biphenyl groups, pyridinyl groups, and naphthyl groups, all of which are optionally substituted.

Arylalkyl Groups.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl (also known as benzyl) groups.

Alkylaryl Groups.

Alkylaryl groups are aryl groups substituted with one or more alkyl groups wherein the alkyl groups optionally carry additional substituents and the aryl groups are optionally substituted. Specific alkylaryl groups are alkyl-substituted phenyl groups such as methylphenyl (also known as toluyl).

Optional substitution of any alkyl, alkenyl and aryl groups includes substitution with one or more of the following substituents: halogens, —CN, —COOR, —OR, —COR, —OCOOR, —CON(R)$_2$, —OCON(R)$_2$, —N(R)$_2$, —NO$_2$, —SR, —SO$_2$R, —SO$_2$N(R)$_2$ or —SOR groups. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for alkyl, alkenyl and aryl groups include among others:

—COOR where R is a hydrogen or an alkyl group or an aryl group and more specifically where R is methyl, ethyl, propyl, butyl, or phenyl groups all of which are optionally substituted;

—COR where R is a hydrogen, or an alkyl group or an aryl groups and more specifically where R is methyl, ethyl, propyl, butyl, or phenyl groups all of which groups are optionally substituted;

—CON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;

—OCON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;

—N(R)$_2$ where each R, independently of each other R, is a hydrogen, or an alkyl group, acyl group or an aryl group and more specifically where R is methyl, ethyl, propyl, butyl, or phenyl or acetyl groups all of which are optionally substituted; or R and R can form a ring which may contain one or more double bonds.

—SR, —SO$_2$R, or —SOR where R is an alkyl group or an aryl groups and more specifically where R is methyl, ethyl, propyl, butyl, phenyl groups all of which are optionally substituted; for —SR, R can be hydrogen;

—OCOOR where R is an alkyl group or an aryl groups;

—SO$_2$N(R)$_2$ where R is a hydrogen, an alkyl group, or an aryl group and R and R can form a ring;

—OR where R=H, alkyl, aryl, or acyl; for example, R can be an acyl yielding —OCOR* where R* is a hydrogen or an alkyl group or an aryl group and more specifically where R* is methyl, ethyl, propyl, butyl, or phenyl groups all of which groups are optionally substituted;

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups, and methoxyphenyl groups, particularly 4-methoxyphenyl groups.

As to any of the above groups which contain one or more substituents, it is understood that such groups do not contain any substitution or substitution patterns which are sterically impractical and/or synthetically non-feasible. In addition, it is understood that if groups that are commonly considered reactive with bromine and/or trihalides, such as alkenes, alkynes, thiols, mercaptans, phosphines/phosphites, or neutral amines, that groups must be attached directly to, and/or in the immediate vicinity of these potentially reactive moieties such that reaction with bromine and/or trihalides is strongly suppressed.

The compounds of this invention may contain one or more chiral centers. Accordingly, this invention is intended to include racemic mixtures, diasteromers, enantiomers and mixture enriched in one or more steroisomer. The scope of the invention as described and claimed encompasses the racemic forms of the compounds as well as the individual enantiomers and non-racemic mixtures thereof.

In some embodiments, the present invention comprises the deposition of a particular form of oxidizing agent having high kinetic reactivity with respect to mercury onto a finely divided, high surface area material that is non-reactive with respect to the oxidizing agent. The resulting composition may be used according to a variety of methods for the removal of mercury and certain other toxic, or otherwise undesirable substances from gases. Features of various embodiments of the invention may include a number of the following aspects.

Currently, a common method for removing mercury from flue gases uses activated carbon. While activated carbon is a finely divided, high surface area material, the critical aspect of the utility of activated carbon lies with its ability to effect oxidation of mercury: simple activated carbon is not especially useful for the absorption of unaltered elemental mercury, especially at the high temperatures found in flue gases. Embodiments of the present invention make use of a finely divided, high surface area material which serves as a substrate for the deposition and dispersion of an active oxidizing material that is the primary agent responsible for removing mercury.

When activated carbon is treated with bromide and/or other halide salts, these salts serve to facilitate Hg oxidation, and/or trap mercury that becomes oxidized on the surface of the activated carbon. When activated carbon is treated with bromine, reaction with the activated carbon may occur to give carbon-bromine bonded moieties that can, again, facilitate Hg$^0$ oxidation and/or trap mercury oxidized on the activated carbon surface. The actual chemical reaction of the bromine with activated carbon is desirable for that system because it provides a stable source of bromine through its immobilization by covalent bonding: lacking that chemical bond forming reaction, bromine adsorbed on carbon surfaces may evaporate/out-gas relatively easily, while bromine that has penetrated and/or diffused into hard to reach pores without reacting may not be kinetically available for direct oxidation of mercury. In some embodiments of the present invention, the bromine-based oxidizing agent has not undergone reaction with the finely divided surface/substrate, and is thus kinetically available for reaction with mercury.

While bromine is capable of oxidizing mercury when injected into a flue gas stream, it is dangerous to work with and extremely corrosive. In the present invention, use is made of trihalide salts (also referred to as perhalide salts), that are relatively stable, solid halogen substitutes.

While in principal, trihalide salts could be directly injected into flue gas streams, in pure form they are waxy solids that tend to clump together. In embodiments of the present invention, therefore, deposition of the trihalide salts onto a finely divided, high surface area, non-trihalide-reactive substrate allows for their introduction to a flue gas stream in such a way that a highly exposed surface area of the oxidizing trihalide is available, thereby allowing for higher efficiencies of oxidation and material usage.

A specific embodiment of the present invention may involve taking fly ash produced at a power plant/furnace and treating it on-site with a quaternary ammonium trihalide dissolved in an organic solvent. After evaporation of the solvent, the material may be introduced into the flue gas stream at any of a number of possible locations, where it will react with elemental mercury in the flue gas, thereby decreasing mercury emissions. Even under the circumstances of certain of the above described embodiments, for certain applications there will be a number of sub-embodiments possible with respect to the composition of the ammonium trihalide, the finely divided, substantially non-reactive substrate onto which it is deposited, the means by which it is deposited onto that substrate, and whether the substrate is additionally treated with any of a number of added materials to enhance either the stability of the modified substrate in terms of oxidation capacity, and/or the kinetics of the mercury oxidation, and/or the extent of the mercury oxidation (i.e., the overall capacity). In addition, the present invention includes embodiments that are more appropriate for other circumstances, such as those that allow for the reduction of toxic or otherwise undesirable compounds in gases other than flue/exhaust gases, or those in which a solid support other than ash is more convenient and/or economical.

The Ammonium Trihalide Oxidizing Agent.

The halogens are oxidizing agents with respect to many substances. Standard electrode potentials of fluorine, chlorine and bromine are such that they will react with mercury to form $HgX_2$, where X=F, Cl, and/or Br, and the mercury is considered to be $Hg^{2+}$. Iodine has a less positive standard electrode potential, and while it can react directly with iodine, it produces $Hg_2I_2$ which may undergo disproportionation to give back elemental mercury ($Hg^0$) and $HgI_2$. In the context of the present invention, bromine is of particular interest: it is sufficiently reactive with mercury to directly and irreversibly oxidize it to $Hg^{2+}$, but is not as hazardous to use as chlorine or fluorine. It is also easier to handle bromine than chlorine or fluorine: while the latter two halogens are gases at room temperature, bromine is a volatile liquid (boiling point 59° C.).

Though bromine may be safely used by well-trained personnel, it represents a substantial hazard risk to casual or poorly trained users. It is also extremely corrosive, and due to its high vapor pressure under standard conditions, can be difficult to measure and handle. All of the above problems apply to bromination of activated carbon, but in practice are solved by bromination conducted off-site from the eventual source of use by skilled operators to give bromine/bromide containing material that is no longer particularly hazardous, and can be transported by truck to the power plant or furnace. The costs of AC transportation can be quite significant, especially since a large power plant may consume many tons of AC/brominated-AC per day.

One of the attractive features of the present invention is that it makes it relatively straightforward to accomplish the on-site preparation of a mercury-removing material using inexpensive and/or unwanted by-products produced on-site, in conjunction with a relatively small amount of readily transportable mercury-removing oxidizing material that can be handled with relative safety by workers of average competence. As noted above, the most likely common embodiment of the present invention will be the use of fly ash produced by a power plant/furnace to prepare a mercury-removing material. Simple treatment of fly ash with bromine is ineffective: having arisen from a strongly oxidizing environment, fly ash is substantially unreactive towards oxidizing agents, and so will not chemically fix bromine in a fashion similar to activated carbon. And, fly ash has no particular affinity for bromine, so any bromine added to it is rapidly lost by evaporation. Finally, even if fly ash were to chemically react with bromine, and/or retain it by some adsorptive/absorptive mechanism, bromination on-site would constitute a substantial hazard to workers.

However, a solid phase functional equivalent for the volatile bromine exists: the tribromide (or perbromide) ion, $Br_3^-$. This is formed in an equilibrium reaction between bromine and bromide, as shown in Equation 1:

$$Br^- + Br_2 \rightleftharpoons Br_3^- \quad \text{(Eq. 1)}$$

Equation 1 ignores the cationic counter-ion which for some embodiments may be quite important. Alkali metal tribromides have been very rarely reported, and only in the context of unusual chemical environments. With transition metals, it is probably appropriate in this context to refer to perbromide: while substances of the type $MBr_3$ certainly exist and are referred to as tribromides, this is a case of three separate/non-associated bromides attached to the metal ($M^{3+}$), rather than $Br_3^-$ attached to $M^+$. Apparently, the tribromide/perbromide ion only commonly exists in a relatively stable form with ammonium salts as counter ions. The most frequently encountered example of this is commercially available pyridinium tribromide (PTB), which is a bromine substitute that so safe and easy to handle that it is the reagent of choice in undergraduate chemistry teaching laboratories when a brominating agent is required. We find that commercially available PTB is, in fact, capable of removing mercury from gas, but its physical characteristics as a waxy solid make it somewhat less desirable than alternate formulations of it, as described below. In particular, adhesion of PTB to itself leads to a less-than-desirable surface area-to-weight ratio for the material that will tend to make it less economical than desired for mercury removal.

Pyridinium tribromide (PTB) deposited on fly ash improves the physical characteristics of the mercury removing material while decreasing the amount necessary for a kinetically rapid process. For example, when the mercury adsorption capacity of a freshly prepared 3.7% (w/w) loaded PTB/fly ash sample was examined by means described in the Examples, it was found to have performed quite well, with a capacity of ~4450 μg Hg/g adsorbent. However, compositions prepared in this way may not have as great a stability as might be desired for some purposes. Thus, when the composition described above is aged for a few hours, there is a significant decrease in mercury removal capacity, and aging for a day led to complete loss of mercury removing capacity, as shown in FIG. 1. Aging at elevated temperatures provides a more rapid loss of activity. Though it is conceivable that modifications to the fly ash through addition of additional substances might provide greater aging stability, there is considerable motivation to develop ammonium trihalides that exhibit enhanced stabilities with respect to aging and temperature.

In some embodiments, the alkaline nature of fly ash may lead to deprotonation of the pyridinium, thereby losing whatever stabilizing influence the ammonium salt provides the $Br^-$. Lacking this stabilizing influence, the tribromide might dissociate to bromide and bromine, which could then be rapidly lost by evaporation/volatilization, as illustrated in Equation 2:

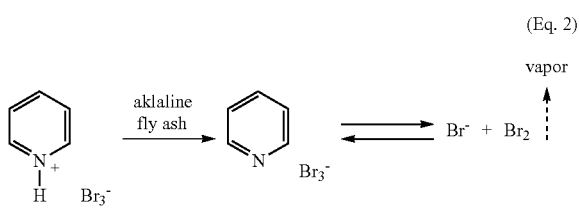

(Eq. 2)

In some embodiments, the situation may be more complicated than that depicted in Equation 2. Experimental results suggest, for example, that when bromine is mixed with N-butylpyridinium bromide in chloroform the N-butylpyridinium tribromide that would be expected from this combination would not undergo the sort of deprotonation depicted in Equation 2 for PTB. However, in an experiment in which the putative N-butylpyridinium tribromide was deposited on fly ash, aging of the resulting material led to relatively rapid loss of activity in terms of removal of mercury from vapor passed through the treated fly ash. Indeed, the behavior of this composition is almost identical to that of the composition prepared by deposition of PTB on fly ash: a freshly prepared 3.7% (w/w) sample of N-butylpyridinium tribromide on FA was analyzed by the same method described for 3.7% w/w PTB/FA, and found to have a similar mercury adsorption capacity (~4160 µg/g composition). However, aging the sample for six hours leads to a complete loss of mercury removing capability. This loss of activity is accompanied by a change in color of the sample from yellow to a white similar to native fly ash, suggesting outgassing of bromine. As described for PTB/FA compositions, while this level of stability is satisfactory for some purposes, and while it could be that an alternative preparation of this compound, or inclusion of some type of stabilizing agent might lead to improved retention of activity with aging, the availability of mercury removing compositions having inherently superior aging characteristics to PTB- or N-alkylpyridinium compounds remains a desirable goal.

Figure 2:
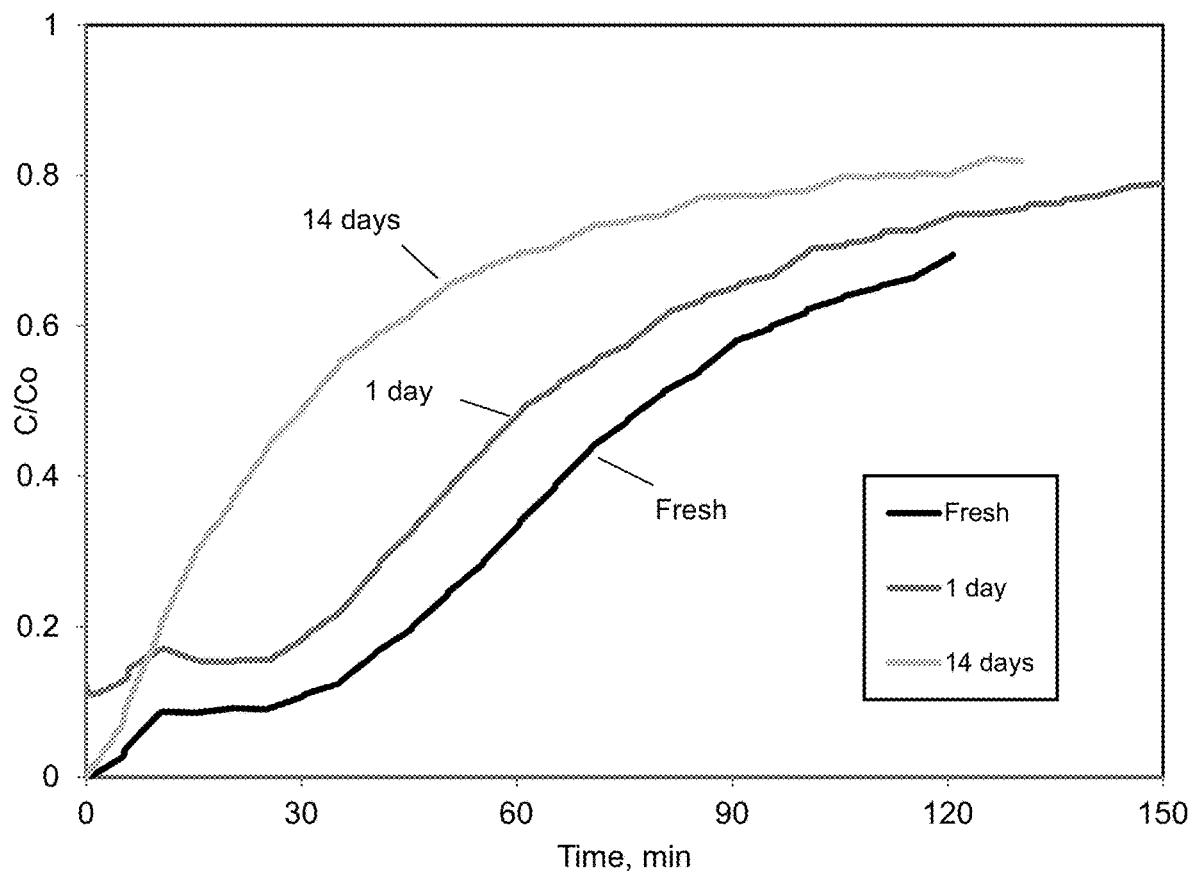
FIG. 2. Mercury breakthrough curves for freshly prepared and aged compositions comprising tetrabutylammonium tribromide (TBAT) on fly ash, illustrating good retention of mercury-decreasing capacity upon aging. Mercury breakthrough curves are shown for 1% wt. TBAT activated FA sorbent sample (FA obtained from Dry Fork Station, refer to preparation steps in example 1) at different aging conditions. The breakthrough curve in black shows the freshly activated/prepared fly ash sample Hg sorption potential (calculated Hg capacity of ~1000 µg/g). Increased periods of aging show a higher decay in the capacity towards Hg removal, however, the decrease in 1 day accounts for 14% of loss in at 90% of breakthrough capacity, and in 14 days the loss at 90% of breakthrough capacity was 54%, a much smaller loss than that observed with PTB treated FA after 1 day (>99%).

Given that N-butylpyridinium tribromide comprises a quaternary ammonium tribromide, other quaternary ammonium tribromides may behave in a similar fashion, with some utility in the removal of mercury from gases, but with that utility significantly limited due to a relatively low retention of the bromine activity over time. Thus, it is surprising and non-obvious to find that in contrast to fly ash modified by the putative N-butylpyridinium tribromide prepared from N-butylpyridinium bromide and bromine, fly ash modified by tetrabutylammonium tribromide (TBAT) prepared in a similar fashion from tetrabutylammonium bromide and bromine provides orders of magnitude greater stability with respect to the retention of oxidizing ability. Indeed, as illustrated in FIG. 2, samples of TBAT-modified fly ash retain substantial utility in mercury removal for days and sometimes weeks, and this stability can be further improved as described below by the use of substrate modifiers. Though this difference in behavior is unanticipated, it may be rationalized as being due to the more ready access that the tribromide ion might have to the cationic nitrogen of the N-butylpyridinium moiety, as compared to the less accessible nitrogen of tetrabutylammonium, which is made sterically inaccessible due to the four alkyl groups. Since Coulombic forces scale as the square of the inverse distance between two charged/partially charged species, it may be that the opportunity for closer approach of tribromide to a cation (effectively, a Lewis acid of sorts) shifts the $Br^-+Br_2/Br_3^-$ more towards the more localized/larger magnitude charge of bromide, that would more strongly interact with a cation. The now-uncomplexed bromine can evaporate. This rationalization is also consistent with the observation that when fly ash is pre-treated with the Lewis acidic (and thus "hard"/localized anion stabilizing) $FeCl_3$ prior to application of a TBAT solution, the resulting composition exhibits no significant mercury removal. In this case, a strong $FeCl_3/Br^-$ interaction would favor formation of bromine from the tribromide, and it would be rapidly lost through evaporation.

The above rationalization for the observation that fly ash treated with tetrabutylammonium tribromide is more successful for the removal of mercury in gases than that treated with N-butylpyridinium tribromide is speculation. However, the observation leads to the tentative conclusion that the preferred embodiments of the present invention will comprise a composition resulting from the deposition onto a finely divided, high surface area, substantially non-reactive surface, of ammonium trihalides of the type 1, in which the nitrogen is formally in an $sp^3$ hybridization, as shown in Scheme 1.

Scheme 1

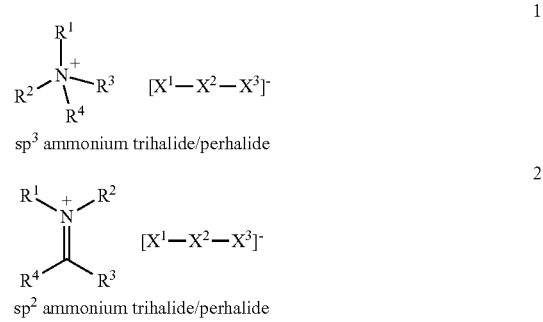

In Scheme 1, $R^1$, $R^2$, $R^3$ and $R^4$ are independently hydrogen, alkyl, aryl, arylalkyl, alkylaryl that may include optional substituents, wherein the definitions of alkyl, aryl, arylalkyl, alkylaryl and "optional substituents" are as given above under "Definitions." Any or all of $R^1$, $R^2$, $R^3$ and $R^4$ may be connected to one or all of the other $R^1$, $R^2$, $R^3$ and $R^4$ groups to provide cyclic or ring structures, such connection being made by chain(s) of $sp^2$ or $sp^3$ carbons, or similar chain(s) that may also include oxygen, nitrogen and/or sulfur. If $sp^2$ hybridized carbons are included in these structures it will generally be desirable that they are not alkenyl carbons, since these could potentially react with the associated trihalide. Similarly, if sulfur and/or nitrogen are present, they should be in a form that is non-reactive to trihalide (e.g., sulfur will usually not be present in the form of thiol or mercaptan, and nitrogen will usually not be present in the form of neutral amine).

In Scheme 1, $X^1$, $X^2$ and $X^3$ are independently F, Cl, Br and I. Preferred embodiments of the present invention for some applications will have $R^1$, $R^2$, $R^3$ and $R^4$ independently as non-alkene containing alkyl groups, branched or unbranched, having one to ten carbons, and $X^1=X^2=X^3=Br$. Such designation of the X groups applies to the compound that is deposited on the finely divided, high surface area, substantially non-reactive surface, and this description specifically does not preclude the possibility that one or more of the X groups might at some time be exchanged for an alternative X group by virtue of the prior, concurrent or subsequent presence of said alternative X group.

By appropriate choice of $R^1$, $R^2$, $R^3$ and $R^4$, or $X^1$, $X^2$ and $X^3$, or of the finely divided, high surface area, substantially unreactive support material, or additional modifying agents, it is desirable to have embodiments of the present invention in which the cationic nitrogen counter-ion to the trihalide is of $sp^2$ hybridization, as shown in Scheme 1 for compound 2. In such embodiments, all of the considerations described for structure 1 with respect to $R^1$, $R^2$, $R^3$ and $R^4$ and $X^1$, $X^2$ and $X^3$ will apply to 2. Thus, embodiments of the present invention are possible in which the cationic nitrogen that serves as the counterion of the trihalide ion could be the nitrogen of a pyridinium, quinolinium, isoquinolinium, imidazolium and/or some other heterocyclic nitrogen compound, provided that the composition produced by the deposition of the trihalide salt has acceptable and appropriate levels of stability and activity, such acceptable and appropriate levels of stability likely arising, in part, from substitution on the heteroaromatic ring, and/or from inclusion of additional heteroatoms in the heteroaromatic ring, and/or from structural features in the additional group attached to the nitrogen (e.g., $R^2$ when $R^1$ and $R^4$ are connected by way of a continuously overlapping set of $sp^2$ hybridized atoms to comprise an aromatic ring). Indeed, even without specialized substitution or characteristics of $R^1$, $R^2$, $R^3$ or $R^4$ (as for pyridinium tribromide) it may be that for economic reasons the preparation and/or use of mercury-removing compositions using ammonium perhalides of the type 2 can be carried out sufficiently rapidly that these compositions become desirable alternatives to those based around trihalides of the type 1.

Characteristics of the Substrate.

From an economic standpoint, it is desirable for some applications that there be rapid and efficient reaction between compositions formed from compounds 1 and/or 2 and mercury (or another target compound). In most cases, this will mean that the substrate that comprises the solid support for 1 and/or 2 will be a finely divided material having a high surface area: deposition of an appropriate amount of trihalide composition will then provide a greater opportunity for elemental Hg atoms to contact the trihalide compound in a rapid fashion and thereby be oxidized. Though an examination of experimental results obtained from mercury removal in a pilot scale test suggest that it is likely that oxidation of mercury occurs principally on the surface of the quaternary ammonium tribromide coated substrate, it is possible that some degree of removal occurs in the gas phase through loss, and subsequent evaporation of bromine. Thus, even under these conditions, and possibly to a much greater extent when the composition is injected at higher temperatures, the compositions of the present invention may comprise in part a simple and safe method for the introduction of otherwise hazardous and difficultly handled bromine gas, wherein benefits of deposition of the mercury oxidizing trihalide on the finely divided substrate accrue from its more rapid volatilization.

Figure 3:
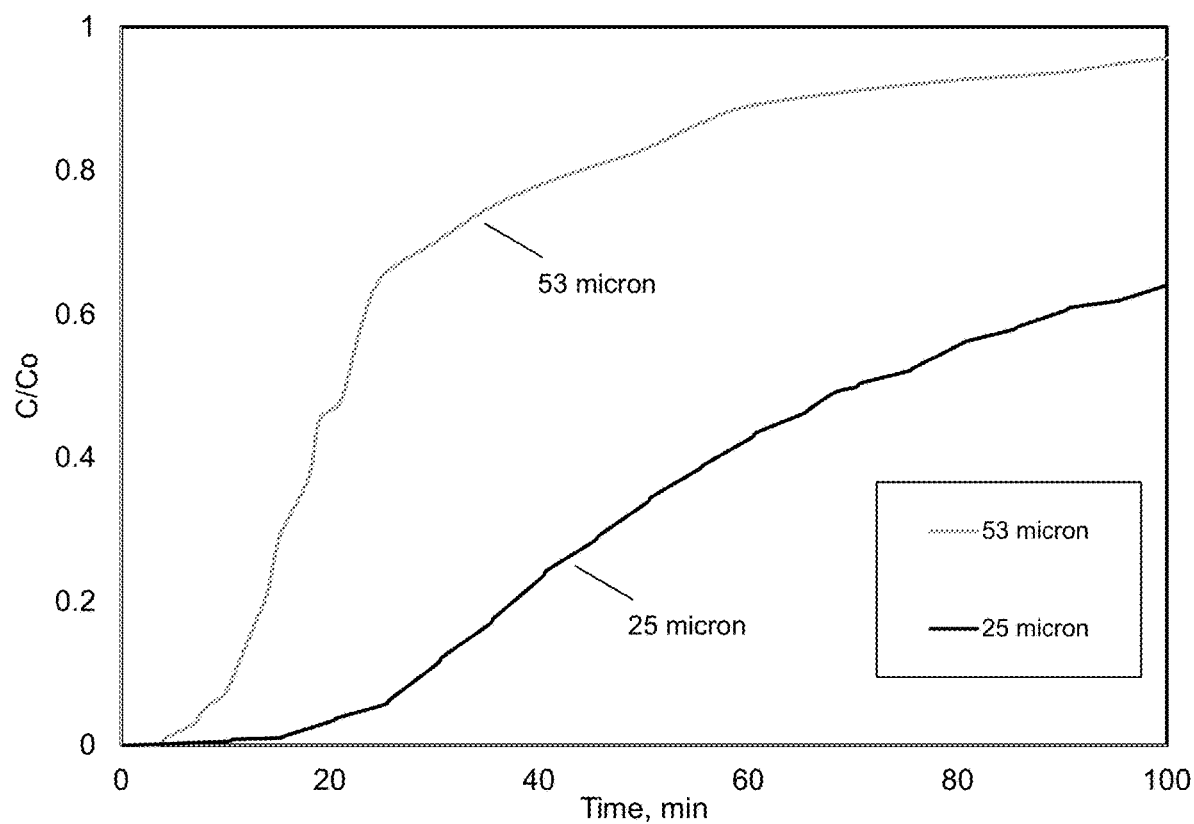
FIG. 3. Mercury breakthrough curves for compositions comprising different particle sizes of TBAT deposited on sodium chloride modified fly ash. Mercury breakthrough curves are shown for 1% TBAT activated FA sorbent samples (FA obtained from Dry Fork Station, refer to preparation steps in example 1) treated with 5% NaCl sieved at different mesh sizes. The breakthrough curve in black shows the performance of a sample sieved through a 25µ sieve which is noticeably higher than that exhibited by the 53µ sieved sample. This fact is indicative of an increased kinetic and removal performance of samples with smaller particle sizes and suggests the likelihood of a higher mercury removal efficiency at "in-flight" conditions at industrial coal-fired burner plants.

In some embodiments of the present invention it will be desirable that the substrate be substantially unreactive with respect to the oxidizing composition 1 (or 2), so that the desired oxidizing power of the composition is retained. One of the benefits of the present invention is that there are many substrates available that fulfill the above requirements. This suggests that it will often be the case that a composition having desirable mercury removal characteristics can be prepared at, and/or near the site where the mercury removal is to be accomplished by transporting a relatively small amount of the active mercury removing agent 1 (and/or 2) and then combining it with a much larger quantity of the finely divided substrate. This will save considerable amounts of money, since current shipping costs for activated carbon variants may be as much as $1/ton per mile. In terms of particle size, preferred embodiments of the present invention will be less than 500 µm in their smallest dimension, and preferably less than 100 µm. Particularly active material may result from substrates composed primarily of particles of less than 25 µm in their smallest dimension, or even less than 1 um. FIG. 3 illustrates the beneficial effect on both the kinetics of mercury capture and capacity that results from decreasing particle size from <53 µm to <25 µm. Naturally available materials that are substantially unreactive towards trihalides, and which have particle sizes within these broad ranges include, but are not limited to fly ash (also known as flue ash), small particle ash from furnaces used for other purposes, Portland cement, other cementitious additives/enhancers (e.g., pozzolans, volcanic ash, energetically modified cements, silica fume), clays, talc/talcum powder, gypsum/gypsum powder, montmorillonite, bentonite and others. It may at times be advantageous to grind and/or otherwise process these materials, and/or to sieve them to obtain an optimal particle size for a particular application, but this is very standard and available technology since such grinding/processing is commonly used in the clays and cement industry. In the case of fly ash, the majority of the "natural" material (that which is directly collected) often has particle dimensions that are substantially less than 100 µm. And, given that many power plants have multiple electrostatic precipitation (ESP) units in sequence it may be possible at times to choose fly ash having more optimal particle size. Many of the preferred embodiments of the present invention will employ substrates that are alkaline, that is materials that would substantially react with Bronsted acids having a pKa of less than 7. Such substrates will tend to decrease any possibility of the release of corrosive hydrogen halide (e.g., hydrobromic acid) into the duct system. Such characteristics will distinguish the present invention from some current technologies in which this occurs, with adverse effects on the exhaust system infrastructure. For example, hydrobromic acid may result from the chemical reaction of bromine with activated carbons at moderately high temperatures, as a result of bromination of aromatic rings and other processes.

Depending on the specific gas and the conditions under which mercury (and/or other contaminants or materials) is to be removed it may be desirable to examine a number of different particle sizes and/or particle morphologies. For example, it may transpire that substrates that comprise larger particles, but having lower densities are more easily made airborne and/or may have a more desirable pore structure resulting in better performance in some conditions. The temperature at which mercury removal is accomplished may also play an important role: it has been observed on occasion that compositions resulting from deposition of TBAT on two substantially different fly ash samples have exhibited reversed relative efficiencies when compared at room temperature and at >120° C.

In some embodiments, temperature may also play a role in the performance of TBAT (and presumably other 1 and/or 2 modified) fly ashes relative to brominated activated carbon. Thus, it is not unusual to find that even low loadings of TBAT (ca. 0.5-1% w/w) on fly ash outperform brominated activated carbon (BAC) at room temperature, whereas the BAC is more effective than these low loaded TBAT/FA compositions at the high temperatures found prior to electrostatic precipitation. However, when the two compositions are compared in the "bag house" (the industrial equivalent of a wood dust removal bag, where fly ash and other solids not captured by ESP are removed), the efficiency of the TBAT/FA compositions improves, whether due to temperature and/or the longer contact time.

While the above characterizations of the substrate have centered on particles that have implicitly spherical, cubical, rod-like and/or irregular shapes, it may at times be desirable to prepare trihalide compositions from fibrous materials. Though such fibrous materials may comprise any type of natural and/or synthetic fiber that is substantially unreactive with halogens and/or trihalide salts, material such as glass wool, fiberglass, and especially rock wool, mineral wool, and ceramic wool may be particularly useful. Aside from their fibrous morphologies, rock wool, mineral wool, and ceramic wool share many of the characteristics that make fly ash an attractive substrate for the methods and compositions of the invention described here. They are formed at high temperatures, often in an atmosphere that would remove any readily oxidizable chemical functional groups, and are thus unlikely to show any reactivity with halogens and/or trihalide salts.

Though obviously not particulate in nature, the diameters of many readily available mineral wool products is in the 2-6 micron range, and by use of specialized techniques this can be varied. This small diameter compensates for the non-particulate shape and provides a very substantial surface area for coating with trihalide salts such as 1 (and/or 2). Finally, the bulk morphology of these fibrous materials is similar to cotton candy and/or bat insulation, allowing for passage of fluids through them, especially gaseous fluids. Contaminant removing compositions resulting from the deposition of 1 (and/or 2) on mineral wools and/or other fibers may find particular utility in applications in which a gas is passed through a pipe and/or channel, wherein undesirable species capable of reacting with halogens and/or trihalides may be removed. For example, a pipe and/or cartridge containing mineral wool having 1 (and/or 2) deposited on it could be used to remove trace amounts of hydrogen sulfide and/or low molecular weight mercaptans such as methanethiol and/or ethanethiol from natural gases prior to catalytic reforming: removal of hydrogen sulfide and mercaptans is of critical importance in this industrial process because they may poison the very expensive catalysts that are critical components in mediating the reformation process.

It should be clear that, in addition to the fluffy bulk morphologies commonly found with glass, mineral, and ceramic wools, contaminant removing compositions could be constructed having a denser form. For example, a piece of fabric woven from fibers impregnated with 1 (and/or 2) could be used to filter condensed and/or gaseous fluids, as could a piece of fabric that was made according to conventional means that was subsequently treated with solid and/or dissolved 1 (and/or 2), provided of course, that the fibers used were substantially unreactive to trihalide salts.

Substrate Modification.

Figure 4:
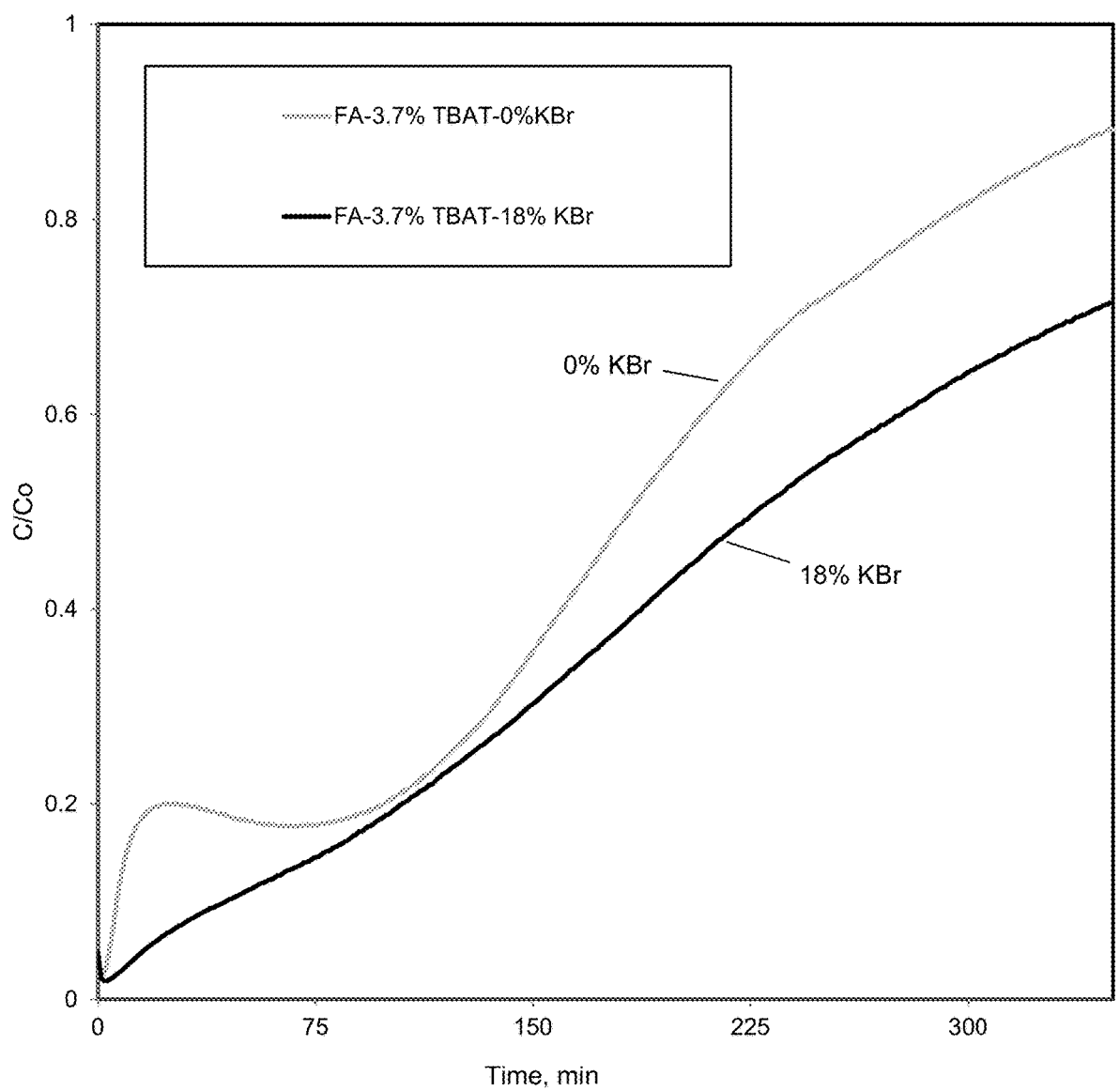
FIG. 4. Mercury breakthrough curves illustrating the enhanced thermal stability of mercury removing compositions comprising TBAT deposited on fly ash that has been previously modified by potassium bromide. Mercury breakthrough curves are shown for 3.7% TBAT activated FA sorbent samples (FA obtained from Dry Fork Station, refer to preparation steps in example 1) at different KBr loadings after preheating both samples at 70° C. for 2 hours in order to test the stability of the perbromide group on the surface of fly ash. The breakthrough curve in black (18% KBr treated sample) shows a higher capacity than the raw fly ash sample after the heat treatment which is indicative of greater stability in the KBr treated sample possibly due to the change in the equilibrium of the perbromide ion induced by the addition of bromide to the sample.

In addition to compounds of the type 1 and 2, other substances may be added to the substrate that may influence the long term stability of the final composition, the kinetics of the reaction with the mercury containing gas, and/or the extent of reaction. As noted above in equation 1, the tribromide ion may be in equilibrium with bromine and the bromide ion. Depending on the length of time that the user wishes to store the composition derived from 1 (and/or 2), and depending on how the composition is formed, there may be some loss of bromine that will lead to a decrease in the activity of the composition as a mercury removal agent. According to Le Chatelier's principle, it would be expected that addition of bromide would shift the equilibrium towards the tribromide ion, and away from the volatile bromine. Indeed, when an aqueous solution of potassium bromide is added to fly ash, the mixture dried to remove water, and then ground to give a finely divided, high surface area powder, deposition of tetrabutylammonium tribromide provides a composition that has enhanced stability with respect to aging; that is, the activity towards mercury removal does not drop as rapidly with time, and the mixture retains activity for weeks. As shown in FIG. 4, such compositions also exhibit enhanced stability with respect to temperature, a desirable characteristic in the often hot environment of power plants.

Figure 5:
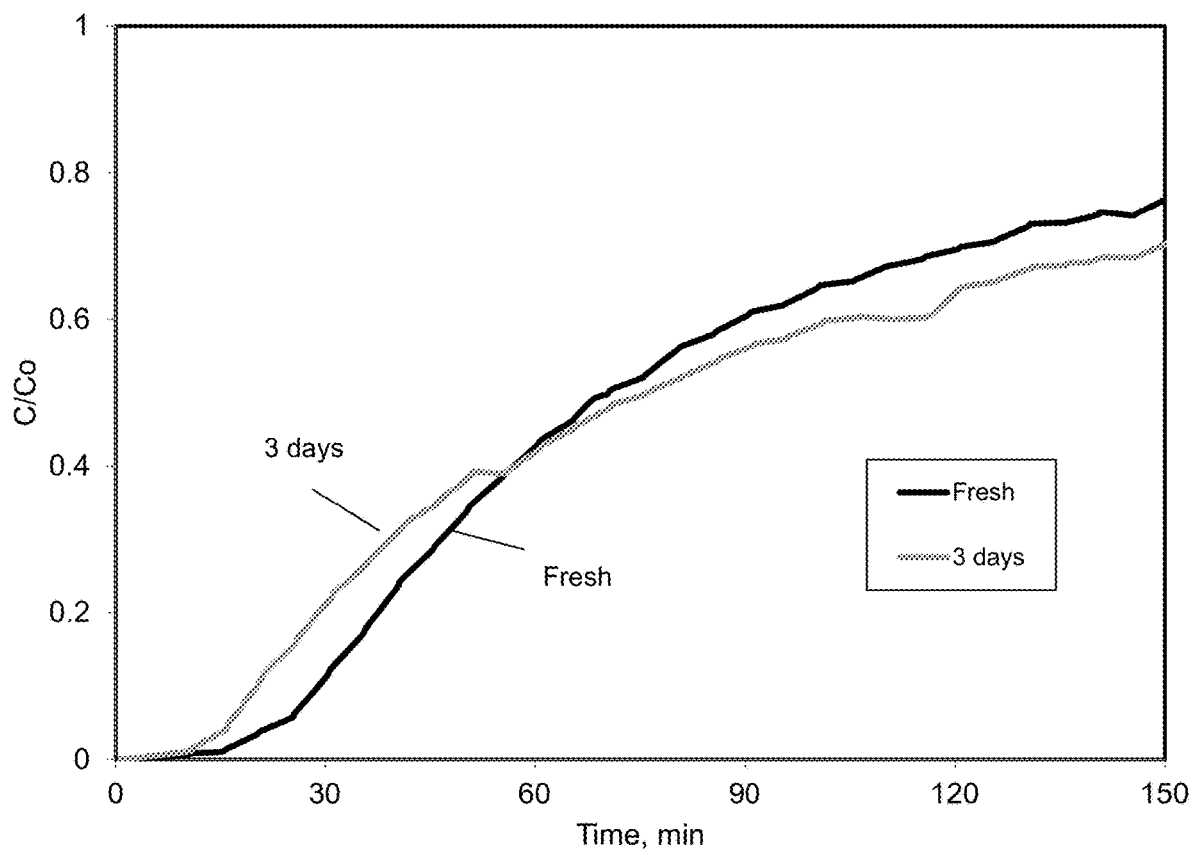
FIG. 5. Mercury breakthrough curves illustrating the enhanced stability of mercury removing compositions comprising TBAT deposited on fly ash that has been previously modified by sodium chloride. Mercury breakthrough curves are shown for a TBAT activated FA sorbent sample (FA obtained from Dry Fork Station, refer to preparation steps in example 1) treated with 5% NaCl at two different aging conditions. The breakthrough curve in black demonstrates freshly activated/prepared fly ash sample Hg sorption capacity. The breakthrough curve in light gray, demonstrates the performance of the same sample after 3 of aging, exhibiting a negligible loss in capacity.
Figure 6:
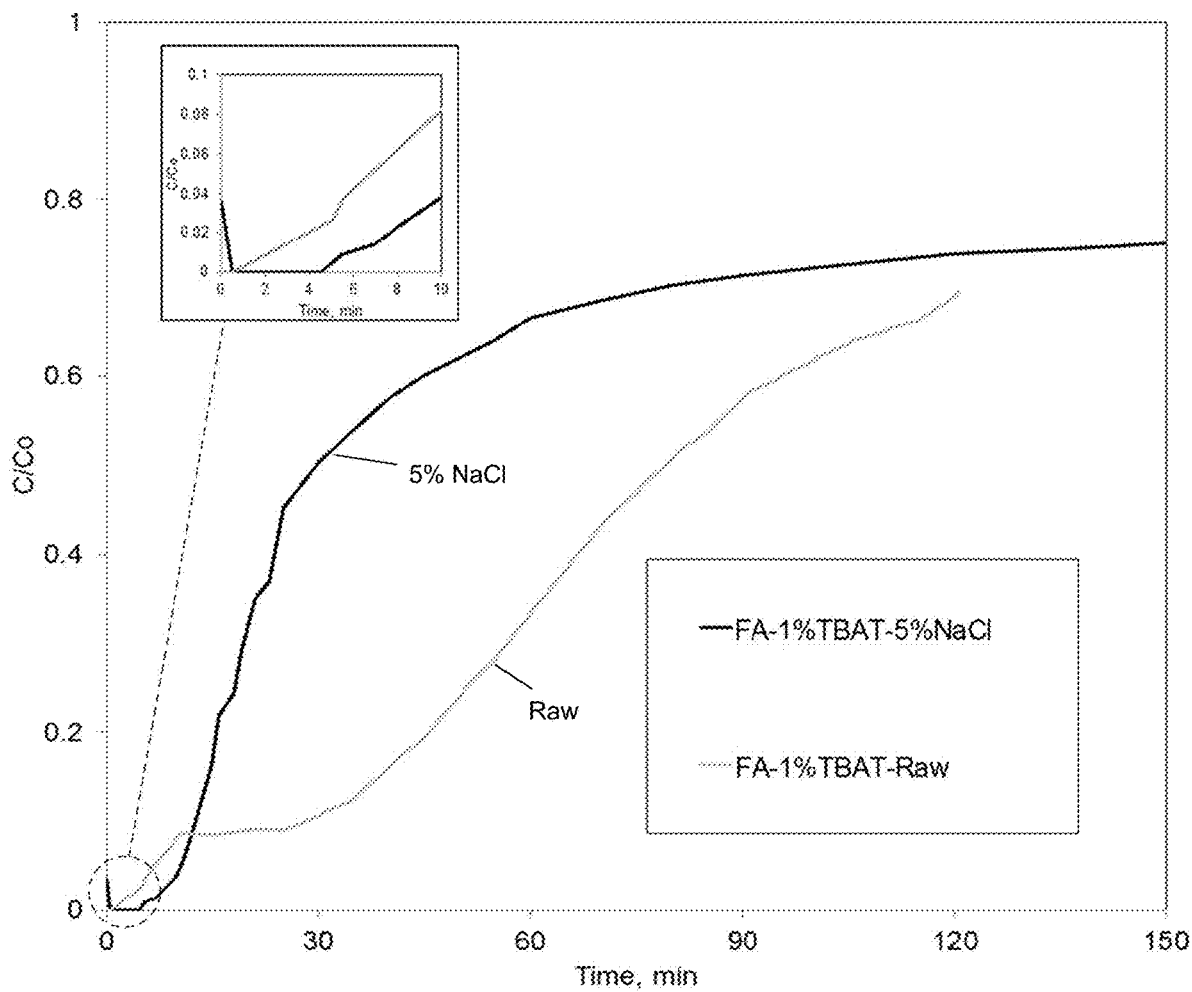
FIG. 6. Mercury breakthrough curves illustrating the enhanced kinetic behavior with respect to substantially complete removal of mercury over short time intervals using compositions comprising TBAT deposited on fly ash that has been previously modified by sodium chloride. Mercury breakthrough curves are shown for 1% TBAT activated FA sorbent samples (FA obtained from Dry Fork Station, refer to preparation steps in example 1) treated with 5% NaCl and 0% NaCl. The breakthrough curve in black shows the improved kinetic effect of the NaCl treatment, particularly during the first 10 minutes of the experiment as outlined on the graph inset. In terms of the performance over a longer period of time, a decrease in the overall mercury removal capacity was observed for the NaCl treated sample, however, as mentioned elsewhere this fact might not be as important towards the performance at an industrial coal-burning facility as the initial kinetics are, especially for "in-flight" capture processes.

The stabilizing effect described above is not limited to the use of a halide salt that is the same as the halides of the tribromide oxidizing salt. For example, if fly ash is treated with aqueous sodium chloride so as to make it 5% w/w in NaCl, the resulting cake dried, ground, and sieved to give particles of less than 53 μm, and then tetrabutylammonium tribromide deposited on it as a chloroform solution, the dried composition that results shows enhanced stability with respect to aging, as illustrated in FIG. 5, where it is shown that there is little difference between a freshly prepared composition and one that has been aged for three days. Interestingly, the resulting composition also shows, at room temperature, superior kinetics with respect to mercury capture. Specifically, it has been observed on many occasions that compositions comprising sodium chloride modified fly ash that have been then treated with tetrabutylammonium tribromide show a longer period during which a 100% or near 100% removal of mercury is achieved at room temperature, even when the ultimate capacity of the composition for mercury removal may not have changed substantially, or may have even decreased, as illustrated in FIG. 6. As discussed in greater detail below, this kinetic enhancement of mercury removal (that is, the extended period of time during which complete or near complete mercury is achieved) may have important economic advantages when the compositions are employed in regions of the exhaust system in which there is only a relatively short contact time between the compositions and the flue gases, since it may allow for a lower loading of the composition, or lesser injection of it into the exhaust system.

The origin of this effect is not known with any certainly. However, equilibria in which chloride ion combines with bromine to give $[ClBr_2]^-$ have been reported. Such an equilibrium would be expected to provide some stabilization of the composition by disfavoring the presence of bromine;

and, such mixed halide ions, $[ClBr_2]^-$, would certainly be expected to have altered oxidation potentials, and possibly mercury reaction kinetics, with respect the simple tribromide ion. Of significant importance in some methods are compositions in which fly ash is treated with alkali metal bromides and chlorides prior to deposition of tetrabutylammonium tribromide. It is also believed that compositions prepared using any of 1 (and/or 2) behave beneficially in the present invention. While it is beneficial in some embodiment that the counter-ion to the halide is sodium and/or potassium, in some other embodiments, it is desirable to have other cations, including but not limited to $Li^+$, $Na^+$, $K^+$, $Cs^+$, $Mg^{2+}$, $Ca^{2+}$, $Sr^{2+}$, $Ba^{2+}$, and any quanternary ammonium salt (e.g., tetramethylammonium, tetraethylammonium, tetrapropylammonium, tetrabutylammonium, etc. and/or any other quaternary ammonium salt similar or identical to those ammonium salts that comprise the cationic component of 1 and/or 2). There may also be circumstances in which it is preferable to carry out the treatment with the halide after deposition of the ammonium trihalide, or simultaneously with the trihalide. And, it may be that the use of other halides (e.g., salts of fluoride and iodide) may provide effects on the activity and/or other properties of the compositions that could be desirable under some circumstances.

Deposition of 1 (and/or 2) and Modifiers on Substrates.

While some embodiments of the present invention may simply involve addition of a finely divided modifying agent and/or 1 (and/or 2) to the substrate, other embodiments make use of a solution of the modifying agent and/or 1 (and/or 2) in an appropriate solvent. While the low cost of water will recommend it as a solvent choice in some embodiments for either or both of the depositions of modifying agent (if used) and/or 1 (and/or 2), water may cause undesirable changes in the substrate through hydration. Such hydration may lead to compositions having larger particle sizes and smaller surface areas than desired, or may have deleterious effects on the trihalide salt. While grinding and/or milling may return the substrate to a desired particle size, in the case of processing after addition of 1 (and/or 2), such processing may at times give lower activity.

Though the use of mists, aerosols and/or other specialized deposition methods may minimize undesirable changes associated with hydration, many of the preferred embodiments of the present invention will avoid these issues entirely by making use of organic solvents for the deposition(s). The possibility of deposition of 1 (and/or 2) using organic solvents represents a distinguishing feature from many conventional compositions and methods, and a very desirable feature, since use of such solvents does not result in significant morphological changes in the fly ash substrate. Specifically, it is found that when sieved fly ash is treated with solutions of TBAT in an organic solvent (e.g., chloroform) and the solvent evaporated, the resulting composition still passes, almost in its entirety, through the same sieve mesh used to prepare the original substrate. For example, when a chloroform solution having sufficient tetrabutylammonium bromide to give 1% w/w TBAT/FA is added to fly ash that has been sieved to <53 μm and the mixture allowed to air dry, the resulting composition still passes through a 53 μm sieve.

Though the use of chloroform as a depositing organic solvent is disclosed above for some embodiments, many other solvents can be used. Such organic solvents may be substantially unreactive with the trihalides being deposited, and optionally allow for the preparation of relatively concentrated solutions of the salt, and will preferably be of relatively low boiling point (typically <180° C., preferably <100° C., most preferably <65° C.) so that they may be readily removed. In some embodiment, the provision for solvent recovery will be desirable. Examples of useful solvents include chloroform, dichloromethane, dimethoxymethane, dimethoxyethane, tetrahydrofuran, tetrahydropyran, diethylether, ethyl formate and acetonitrile, and other solvents may also be preferred for some applications by reasons of cost, convenience and/or other factors. Modifying agents may also be added in the form of ammonium salts, for example tetrabutylammonium bromide and/or tetrabutylammonium chloride, and/or other ammonium salts similar to the cations in 1 and/or 2. Thus, some of the preferred embodiments of the present invention comprise adding a chloroform solution of tetrabutylammonium tribromide to native, and/or sieved fly ash to give a slurry, and then evaporating the chloroform to give the desired mercury removing composition. Another preferred embodiment of the present invention comprises preparing sodium chloride (and/or bromide) modified fly ash by adding an aqueous sodium chloride (and/or bromide) solution to fly ash to give a uniform paste, drying at >100° C. to give a cake, grinding the cake (and optionally sieving it) to give a powder having a desired particle size, and then applying a chloroform solution of tetrabutylammonium tribromide to give a slurry, and then evaporating the chloroform to give a mercury removing composition comprising sodium chloride (and/or bromide) modified fly ash having tetrabutylammonium tribromide. Yet another preferred embodiment of the present invention comprises adding a chloroform solution of tetrabutylammonium chloride (and/or bromide) to fly ash (native, and/or sieved to a desired particle size), evaporating the chloroform, and then adding a chloroform solution of tetrabutylammonium tribromide to give a slurry, then evaporating the chloroform to give a mercury removing composition comprising tetrabutylammonium salts of chloride and tribromide (or, as discussed above, possibly salts of $ClBr_2^-$). The latter preparation may preferentially be modified such that the tetrabutylammonium bromide and tetrabutylammonium tribromide are combined in the same chloroform solution, and a single deposition step used. While all of the descriptions given above comprise a single coating of a given substance on the substrate, these descriptions should not be taken to imply that it might not be preferable in some cases to make multiple coatings of the same substance on the same batch of substrate.

Though the greatest degree of dispersal of the trihalide salt may come from application of a mist and/or aerosol to a continuously mixed substrate, for some applications of the invention this may be inconvenient and/or expensive. While satisfactory results may at times be obtained by simply adding a solution of the trihalide salt to the substrate and rapidly mixing, it may be preferable to mix finely divided trihalide salt with the substrate, and then add solvent to the resulting mixture. Such methods provide a good dispersion of the trihalide, followed by dissolution and dispersion in a very uniform fashion. Indeed, it may sometimes be sufficient to simply mechanically mix and/or tumble the trihalide salt/substrate mixture at a temperature sufficient to soften the trihalide to the extent that it will coat substrate particles, but at a low enough temperature that the activity of the trihalide is retained.

Figure 7:
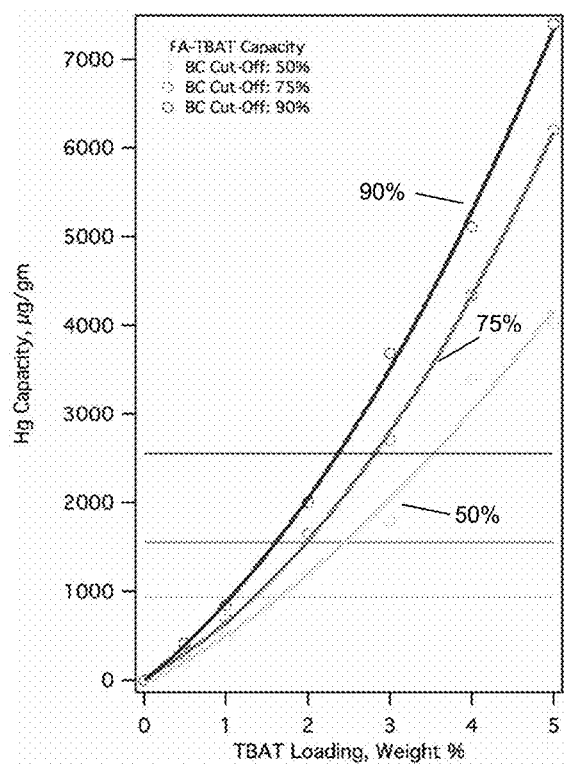
FIGS. 7A-7B. Mercury removing capacity curves for various loadings of TBAT on fly ash. Mercury capacity curves for various TBAT loadings.
Figure 7:
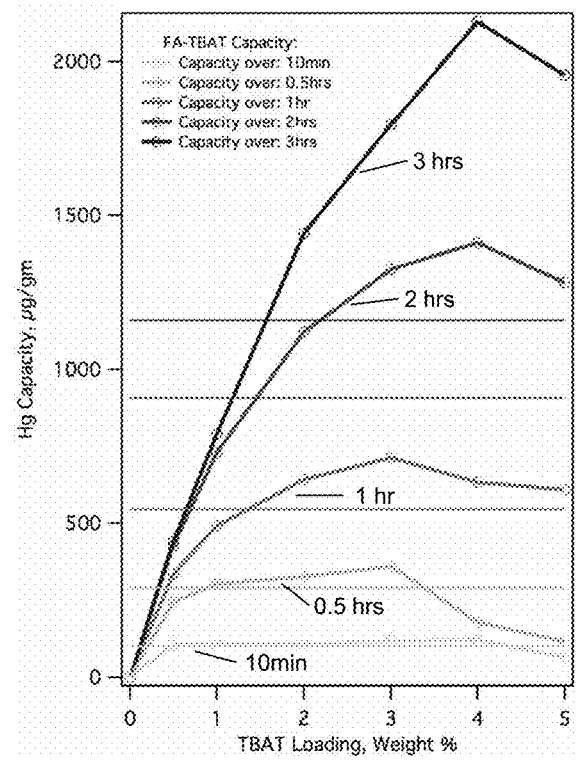
Figure 8:
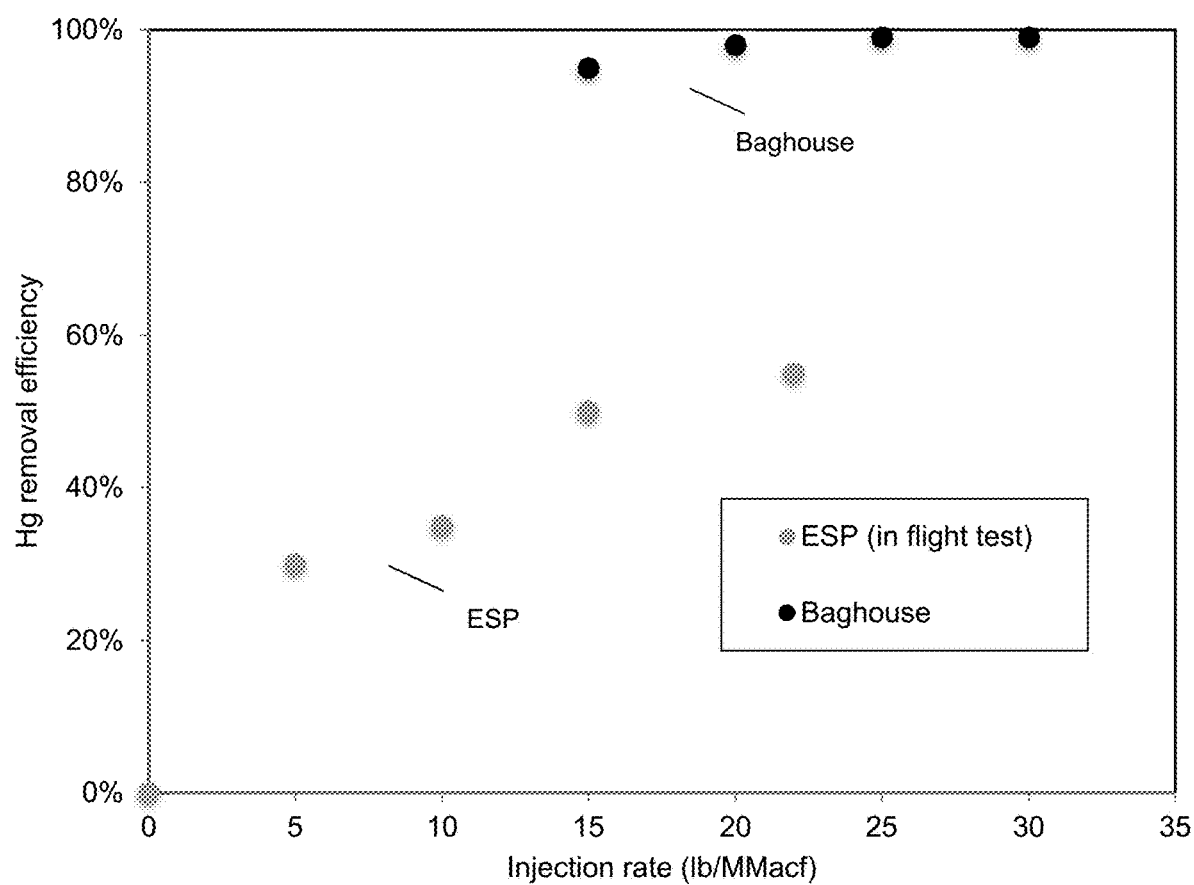
FIG. 8. Mercury removal efficiencies for in-flight and baghouse tests at the Combustion Testing Facility injecting a 3.7% TBAT-0.91% KBr/FA. Mercury removal efficiencies are shown for an in-flight and baghouse tests at the Combustion Testing Facility using a 3.7% TBAT-0.91% KBr (1 equivalent) activated FA (FA obtained from Dry Fork Station, refer to preparation steps in example 1). In-flight tests exhibited removal efficiencies above 50%, however the injection rates (>15 lb/MMacf) are considerably higher than those utilized by commercially available products. Baghouse mercury capture tests, on the other hand, exhibited full removal efficiency at high injection rates.

The amount of modifying agent and/or active oxidant 1 (and/or 2) deposited on the substrate may vary considerably. For the modifying agent, amounts will typically range from 0-50% w/w relative to the substrate, with 0-5% being more typical for some applications. For the active oxidant 1 (and/or 2), amounts will typically range from 0.05-25% w/w with respect to the substrate, but more commonly for some applications 0.1-5% w/w with respect to the substrate. It may also be desirable to adjust the loading of 1 (and/or 2) depending on where mercury removal is to occur. Some compositions of tetrabutylammonium tribromide (and/or other 1/and/or 2) may react quickly, but may have low overall Hg removal capacity. This was discussed briefly, above, in the context of sodium chloride modified TBAT/FA compositions, and was illustrated in FIG. 6. This is not a problem in applications in which the contact time between the mercury removing composition and the gas is short, such as applications in which the compositions are injected prior to the electrostatic precipitators in a power plant. In such settings, the contact/residence time is short, and so what is of principle importance is the kinetics $Hg^0$ removal: having a larger long-term capacity is wasted, since there will likely not be sufficient opportunity for full reaction to occur. This is illustrated in FIGS. 7A-7B, in which it is shown that varying degrees of loading of TBAT may perform comparably at short residence times, though their long-term capacities may differ considerably. In such short residence time processes, loading excess 1 (and/or 2) on the substrate may be uneconomical, since the oxidation/capture-performance will likely not scale with active oxidant loading, and it is the oxidant that will likely be the most expensive component of the composition. On the other hand, in applications in which the mercury removing composition is introduced prior to a bag house collector (akin to the fabric bag used in wood dust removal systems), gases will have a much greater opportunity to contact the composition for a longer period of time, and the system may act more like a packed bed reactor. In such cases kinetics are somewhat less important, and it may be desirable to have a higher loading of a smaller amount of oxidant/substrate composition, both from the standpoint of convenience of preparation, as well as from the standpoint of minimizing additional inputs of fly ash (and/or other substrate) into the system. The differing performances of a TBAT/FA composition in pre-ESP and baghouse environments are illustrated in FIG. 8.

Figure 9:
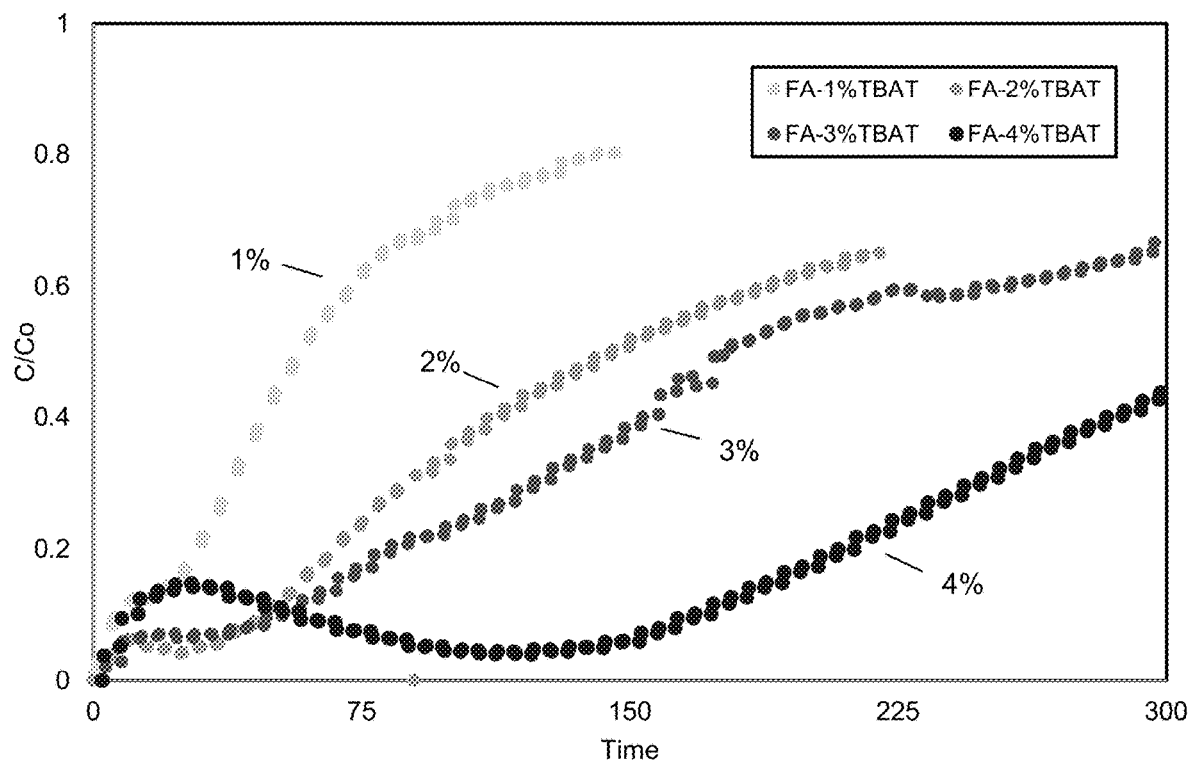
FIG. 9. Mercury breakthrough curves illustrating the increased capacity of TBAT/FA compositions having differing TBAT loadings. Mercury breakthrough curves are shown for TBAT activated FA sorbent samples (FA obtained from Dry Fork Station, refer to preparation steps in Example 1) at various TBAT loadings. The curves show an increase in capacity with increasing TBAT loading, however the initial kinetics, particularly the first 30 minutes are not significantly improved with higher loadings of TBAT.

As illustrated in FIG. 9, increased loadings of TBAT may have substantial effects on the overall capacity of the compositions at extended time periods. Thus, one preferred embodiment of the present invention comprises preparation of a mercury removing composition having a low loading of 1 (and/or 2), in the range of 0.1-1 w/w, on fly ash and/or another suitable substrate, that may be optionally/additionally modified with a halide, and contacting it with a gas for a short time (<300 seconds) prior to precipitation by an electrostatic precipitator. An additional preferred embodiment of the present invention comprises preparation of a mercury removing composition having a moderate loading of 1 (and/or 2), in the range of 1-5% w/w, on fly ash and/or another suitable substrate, that may be optionally/additionally modified with a halide, and contacting it with a gas for a relatively long period of time (e.g., 200-20,000 seconds), preferably in conjunction with some filtering mechanism whereby the gas carries the mercury-removing composition to the filtering medium and is forced to then pass through already retained mercury-removing composition.

In the examples of deposition of the actual oxidizing species for mercury given above, a pre-formed tribromide (and/or other trihalide) may be used. This will often be convenient, since ammonium tribromide salts of the type 1 (and/or 2) are readily prepared, and may exhibit good stability for the purposes of the present invention. However, there may be embodiments of the present invention in which the oxidizing trihalide is formed on the finely divided, high surface area, substantially unreactive substrate, and/or during the process of deposition. Such embodiments follow from the oxidation of bromide to tribromide using a variety of oxidizing agents (e.g., vanadium based, ruthenium based, etc.). Such methods for formation of the actual oxidizing species may be advantageous due to their avoidance of the use of elemental bromine. Thus, embodiments of the present invention may comprise addition of an oxidizing agent capable of converting bromide to tribromide to a substrate that has been pre-modified with an ammonium bromide similar in structure to 1 (and/or 2), but in which the trihalide is replaced by bromide. Alternatively, embodiments of the present invention may comprise addition of an oxidizing agent capable of oxidizing bromide to tribromide to a substrate that has been pre-modified by a combination of an alkali and/or other metal salt of a halide and an ammonium bromide of the form 1 (and/or 2), but with trihalide replaced by bromide, such pre-modification having been carried out with either the simultaneous and/or sequential addition of said alkali and/or other metal salt of a halide and said ammonium bromide. Alternatively, embodiments of the present invention may comprise addition of an ammonium halide of the form 1 (and/or 2), but in which trihalide has been replaced by bromide, to a substrate that has been pre-modified by deposition of an oxidizing agent capable of oxidizing bromide to tribromide.

Removing the Deposited Oxidized Mercury Salts from the Substrate.

Though, as noted previously, the mercury species of greatest environmental concern is mercury in its elemental oxidation state ($Hg^0$), mercury salts in which mercury is present in the +1 and/or +2 oxidation states are also toxic. Thus, it may at times be desirable to remove the mercury salts formed on the surface of the FA of the TBAT/FA compositions. This is relatively straightforward due to the relatively high solubility mercury salts in organic solvents. Thus, it was found that a single extraction using chloroform led to a 61% decrease in mercury levels from a TBAT/FA composition that had been saturated with mercury vapor, wherein all of the trihalide had reacted with mercury to give $HgBr_2$. Dichloromethane was also effective for extraction of mercury salts, and it is clear that many other organic solvents could be used for this purpose. Implementation of such extraction methods on TBAT/FA compositions that have been collected after use in a power generating facility thus allows for the possibility of greater ameliorating the influence of toxic total mercury in the environment. As a possible side benefit of such extraction of spent TBAT/FA preparations, the organic ammonium cations that serve as the counterions to the trihalide ions of 1 (and/or 2) may be removed, which could in some circumstances be desirable if the FA is to be used for some purpose in which the organic ammoniums could interfere.

Contacting the Activated Substrate with the Mercury Containing Gas.

There are a range of means by which the mercury containing gas can be contacted with the mercury-removing compositions of the present invention. Thus, in one embodiment of the present invention that might commonly be employed in a power plant and other furnace operations, the powdered mercury-removing composition is delivered to a mercury-containing stream of gas by means of a screw-type solids addition "pump." In another embodiment of the present invention the screw-type solids addition unit may be supplemented with a compressed gas stream to more finely disperse the exiting solid composition. In yet another embodiment of the present invention, a compressed gas stream may be used to disperse the mercury-removing composition as it falls by gravity into the path of the compressed gas stream directed into, and/or generated within a container having a mercury-containing gas that is not being continuously produced (as it would be in an exhaust stream), but which is substantially static. In yet another embodiment of the present invention, mercury-containing gas is passed over, and/or through the mercury-removing composition that is supported and/or retained on some filter medium: that is, this embodiment comprises using the mercury-removing composition in circumstances akin to a packed bed reactor. In a variant of the just-described use of a filtering medium in conjunction with a finely divided composition prepared from 1 (and/or 2) and a finely divided material, a composition comprised of 1 (and/or 2) deposited on a halogen/trihalide unreactive filter medium such as mineral wool and/or other fibrous material may be employed, as previously discussed during the description of substrates for 1 (and/or 2).

Removal of Other Undesirable Materials from Gases.

Although the above descriptions have focused on the removal of mercury from gases, the methods and compositions of the present invention is not limited to removal of that mercury. Bromine, and the corresponding tribromide ion are powerful oxidizing agents that can react with a range of compounds. Thus, embodiments of the present invention are provided in which a variety of substances having standard electrode potentials that are less positive than that for $Hg^{2+}/Hg^0$ redox reaction may be removed from gas streams. Thus, the present invention also provides for the removal from gases of the following substances, though not limited to the following substances: selenium, thallium, sulfur, bismuth, arsenic, antimony, sulfur dioxide, hydrogen sulfide, mercaptans (RSH), some mercaptoethers (RSR'), germanium, tin, hydrogen selenide, selenides (RSeH), some selenoethers (RSeR'), phosphine and organophosphines/phosphites, lead, nickel, cobalt, thallium, cadmium, gallium, chromium, titanium, aluminum, thorium, uranium, hafnium, beryllium, all lanthanides and any combination of these.

Figure 10:
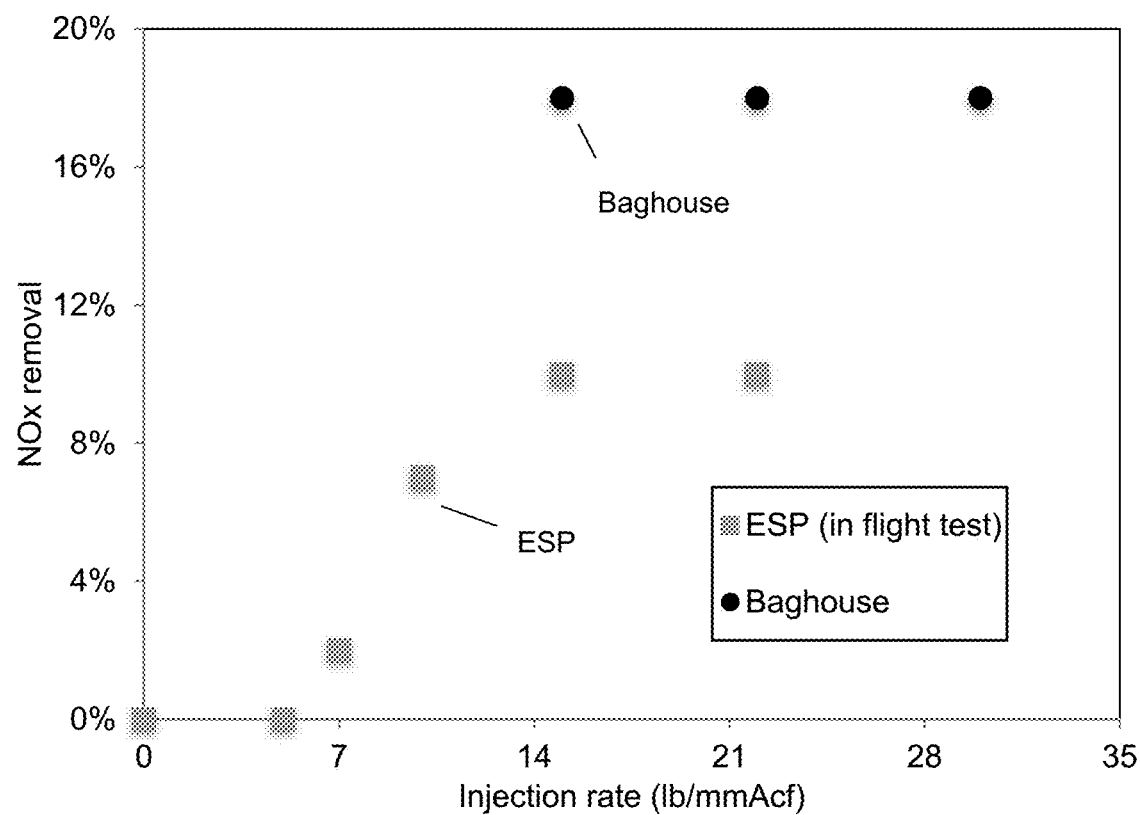
FIG. 10. $NO_x$ removal efficiencies for in-flight and baghouse tests at the Combustion Testing Facility injecting a 3.7% TBAT-0.91% KBr/FA. Nitrogen oxides removal efficiencies are shown for an in-flight and baghouse tests at the Combustion Testing Facility using a 3.7% TBAT-0.91% KBr (1 equivalent) activated FA (FA obtained from Dry Fork Station, refer to preparation steps in example 1). In-flight tests exhibited removal efficiencies above 8% at high injection rates (>15 lb/MMacf). Baghouse nitrogen oxide capture tests, exhibited removals >15%.

It should be understood that the examples given above for substances that can be removed through oxidation by the methods and compositions of the present invention are not intended to comprise a complete or exclusive list. Thus, the compositions described in the present invention may be effective in removing undesirable combustion by-products other than, or in addition to mercury. In particular, it has been found in pilot plant scale tests that compositions comprising tetrabutylammonium tribromide deposited on fly ash may be effective in decreasing "$NO_x$" (commonly, a variety of nitrogen oxide species) levels. The principle $NO_x$ species removed was NO: other $NO_x$ components ($NO_2$, $N_2O$) were not significantly affected. This removal is illustrated in FIG. 10 for a pilot scale application using TBAT deposited on potassium bromide modified unsieved fly ash. Similar results were obtained using TBAT deposited on sieved fly ash that had not been modified with potassium bromide. This is a very important and desirable feature of the present invention, since allowable $NO_x$ emissions are regulated in the United States, and power companies and other furnace operators must spend considerable effort to meet Federal and/or State and local standards. Having a single composition that is capable of decreasing both mercury and $NO_x$ emissions is highly desirable. $NO_x$ removal by the compositions of the present invention may occur to some extent in the region of the exhaust system that is before the electrostatic precipitators (ESPs), but with the compositions examined to date, has been more effective at $NO_x$ removal in the "bag house" region, where decreases greater than 15% in NO have sometimes been observed. This difference is illustrated in FIG. 9. Of course, there may be alternative embodiments of the present invention that would arise from application of the guidelines for preparation described above and/or below that might be more effective in $NO_x$ removal pre-ESP and/or in the bag-house.

Another contaminant of relevance that is present in flue gases is oxidized mercury. Though of somewhat less concern than elemental mercury, mercury salts with mercury in the +1 or +2 oxidation state also represent a health hazard. In a number of pilot plant experiments, discussed in more detail in Example 2, below, it was found that in addition to strongly decreasing the levels of elemental mercury, TBAT/FA compositions effected significant reductions in oxidized mercury levels. Without wishing to be bound by any particular theory, the origin of this reduction of oxidized mercury may have to do simply with the presence of the hydrophobic tetrabutylammonium cation, that might tend to physisorb the mercury salts present.

Although flue gases have been repeatedly mentioned throughout the above descriptions, some effort has been taken to emphasize that embodiments of the present invention are applicable to gases in general. Thus, many of the compounds mentioned in the preceding lists may not be found in flue gases, but would be found in other types of gases. For example, the presence of hydrogen sulfide in methane and/or natural gas may be undesirable in a variety of contexts (e.g., catalytic reforming processes for hydrocarbons using precious metal catalysts that are poisoned by sulfur compounds), and so useful embodiments of the present invention will employ the above described compositions and methods for the removal of sulfur (and selenium) compounds from natural gas and methane. It should be clear to one of skill in the art that embodiments of the present invention will also be useful in facilities that produce, purify, and/or fabricate materials containing lead, thallium, uranium, etc. and thus may produce gases/vapors that contain these toxic substances.

It is of note that the methods and compositions of the present invention likely offer significant advantages over conventional method and composition utilizing activated carbon and brominated activated carbon for the removal of many non-mercury toxic/undesirable substances. This is because the efficacy for AC/BAC relies on special surface chemistry for mercury removal: the surface mediated oxidation of mercury. This particular AC-related surface chemistry may not extend to many other toxic/undesirable substances. In contrast, the methods and compositions of the present invention are simpler in their chemical operation: they act similarly to bromine in directly oxidizing substances. Thus, they will likely have wider application than many technologies currently used for mercury removal.

Another particular advantage of the compositions and methods of the present invention over the traditional activated carbon or brominated activated carbon is that mercury removal (and possibly removal of other compounds) is very effective at low temperatures. Indeed, compositions comprising tetrabutylammonium tribromide on fly ash (either unmodified, and/or modified by bromide and/or chloride) have been observed to be much more effective than brominated activated carbon when removing mercury from vapor at room temperature, while at much higher temperatures such as those found in power plant exhausts lead to a substantial enhancement of the brominated activated carbon activity. Since some circumstances in which mercury and/or other compounds are to be removed from gases may not involve the high temperatures associated with furnace exhaust, the compositions of the present invention may be particularly desirable.

Removal of undesirable materials from liquids. The compositions of the present invention will likely be most useful for the removal of a variety of oxidizable substances from gases, but may also in some circumstances be applicable to the removal of similar substances from liquids. If applied to liquids in which the ammonium trihalides 1 (and/or 2) are soluble, then these compositions will largely comprise a method for a kinetically rapid delivery of highly dispersed oxidizing agent. However, when employed with liquids in which the ammonium trihalides 1 (and/or 2) are insoluble, the present invention will provide for oxidation on the surface of the composition. Of course, it will in most cases be desirable to provide some method of separating the mercury removing composition of the present invention from the liquid. This removal might be accomplished by settling, centrifugation, filtration, and/or some other type of multiphase separation.

Use of the methods and compositions of the present invention in conjunction with other means of mercury-removal. It should be clear that the use of the above described mercury-removing compositions could be used in conjunction with other means of mercury. For example, the compositions of the present invention could be used in conjunction with activated carbon (AC) and/or brominated activated carbon (BAC) by injection before, with, and/or after the AC/BAC. The compositions could be used in conjunction with other technologies, as well.

EXAMPLES

The examples that followed were carried out in either of two sets of conditions: laboratory scale and pilot scale. For laboratory scale, compositions were prepared as described below, and their ability to decrease mercury concentration determined using the following procedure.

Mercury Removal Experimental Setup for Capacity Determination

Figure 11:
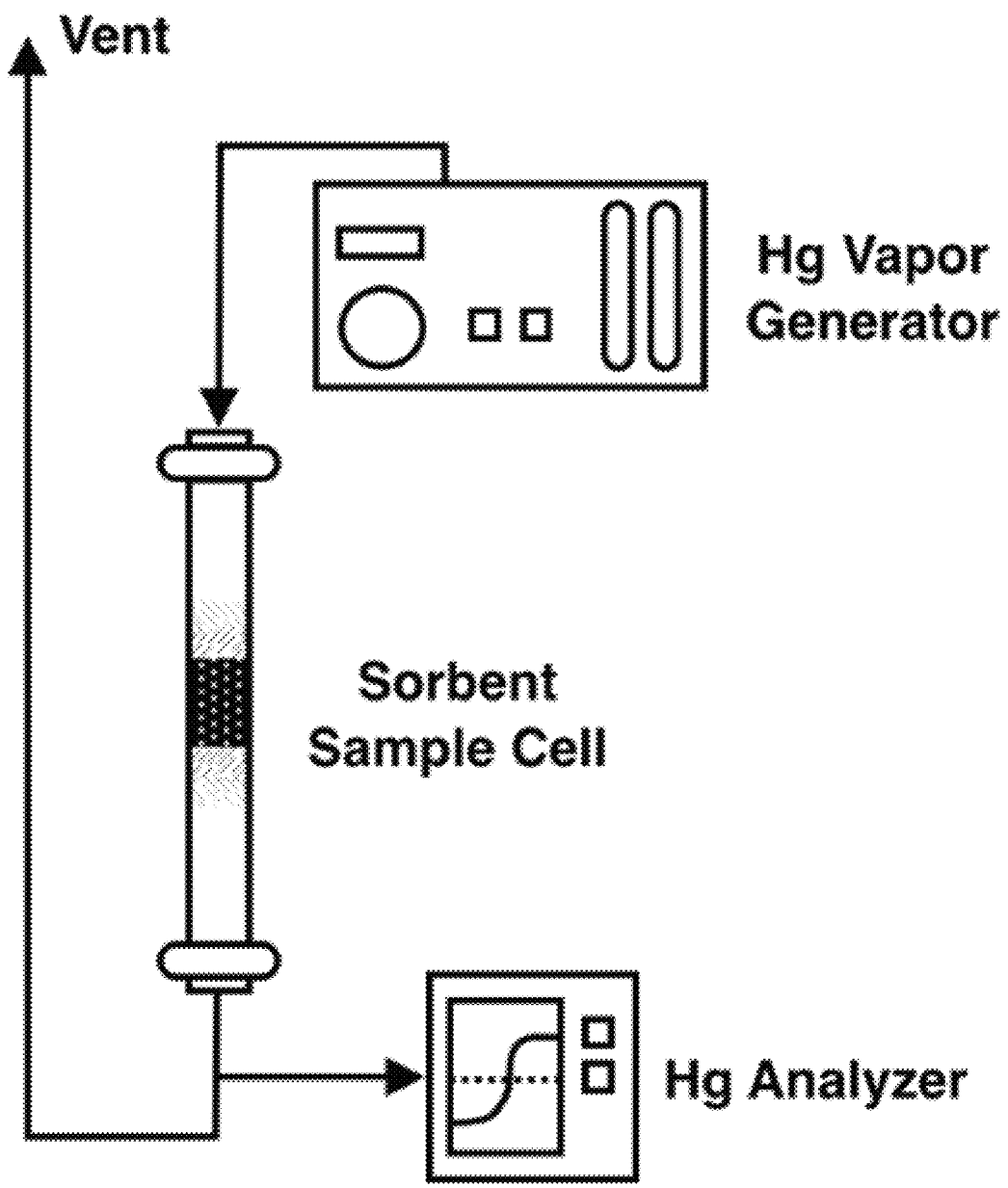
FIG. 11. Schematic of Hg sorption experimental setup.

The Mercury Removal Experimental Setup consists of 3 parts (FIG. 11): a mercury generation unit, a sorbent sample cell, and equipment for analyzing mercury vapor in the air stream (Hg Analyzer). Teflon (PTFE) lines (0.635 cm ID) and fittings were used to connect all streams. To perform the mercury sorption tests, an air stream flowing at ~3 L/min was introduced as a carrier gas into the chamber of the mercury generator, a VICI Metronics Dynacalibrator 350, which generated 1,785 ng Hg/min (~78 kPA). This stream was passed through the packed Hg adsorption bed containing ~50 mg of the sorbent material, which was held between ceramic wool packing. One of the packing materials was located at ~5 cm from one end of a 0.95 cm ID Teflon tube. The effluent stream was measured with a flow meter. One part of the outlet gas stream was vented to a safe exhaust, whereas the remaining part was analyzed using a GLSI Sentinel mercury analyzer. The Hg sorption profiles were collected and recorded using a data acquisition system. Control adsorption tests were carried out to determine the mercury sorption capacity of the materials.

Pilot Plant Experimental Outline and Mercury Removal Capacity Determinations

Figure 12:
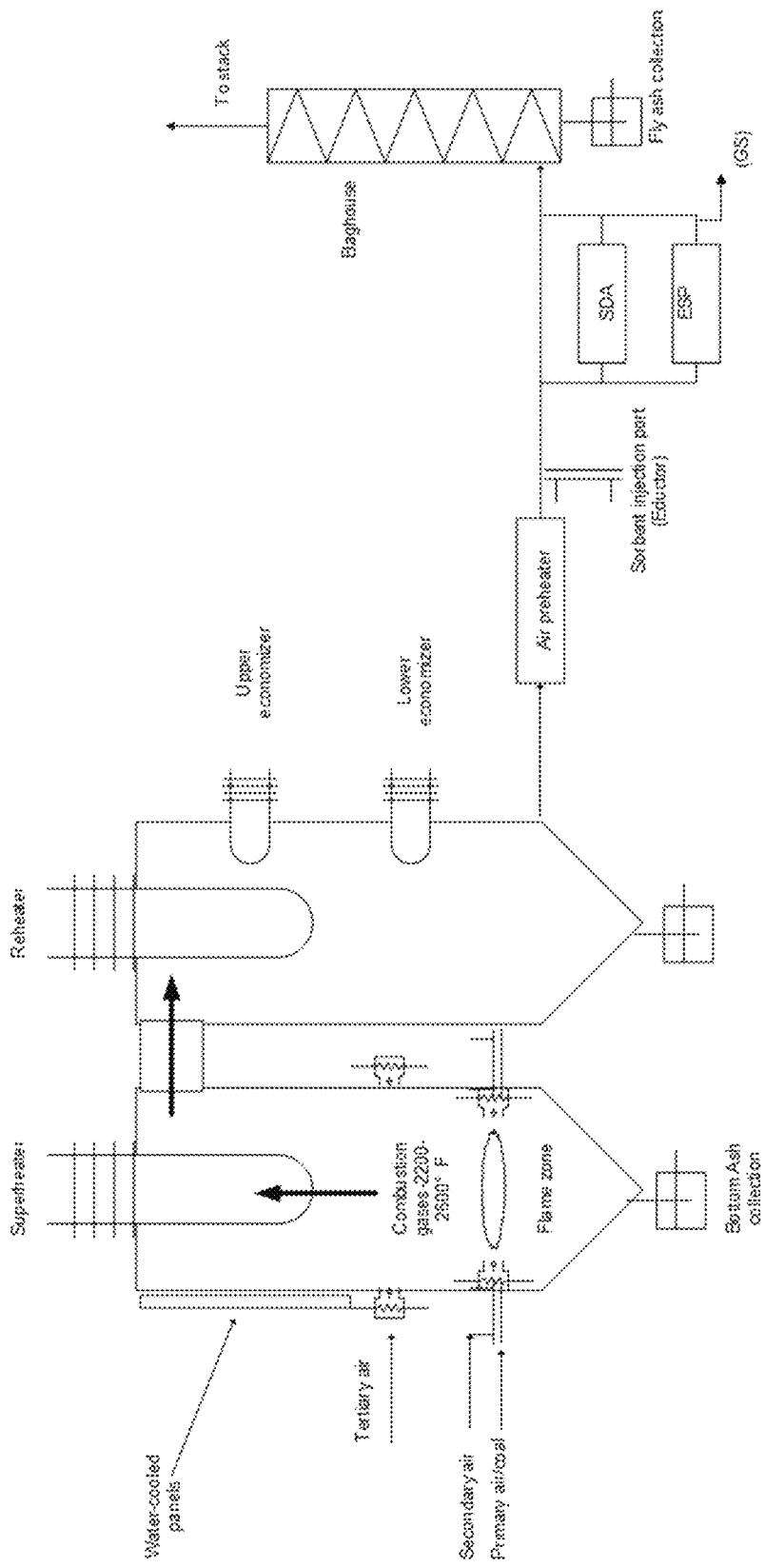
FIG. 12. Schematic of combustion test facility at WRI.

Pilot plant tests were performed at the Western Research Institute's (WRI's) coal Combustion Test Facility (CTF). A schematic of the combustion test facility at WRI is shown in FIG. 12. The CTF is a nominal 250,000 balanced-draft system which can replicate a pulverized coal-fired utility boiler. This unit simulates a tangential-fired boiler. The fuel feed system comprises screw-based feeders and pneumatic transport to four burners inserted in the corners of a refractory-lined firebox. To obtain differential flow characteristics in the firebox, the burners can be and are normally angled. The unit is equipped with appropriately sized heat-recovery surfaces which comprise water-cooled panels that mimic the waterwall, an air-cooled superheater, reheater, two economizers and preheater. These surfaces replicate the time/temperature profile of a utility boiler. Additionally, the CTF contains provisions for preheating the combustion air to simulate a utility air preheater. The system also includes over-fire air injection ports for combustion staging. This unit comprises two configurations of air pollution control devices for mercury sorbent injection, namely, a series of electrostatic precipitators (ESP) and/or two baghouses for continuous fly ash removal and for "clean" sampling under different steady-state operations. The sorbent injection port for the ESP configuration is located downstream of the air preheater allowing for a short contact period of time (~1 s) before the material is precipitated at ESP simulating the injection conditions of a power plant, tests performed at this configuration are known as "in-flight tests". The inlet temperature at the injection port is ~325° F. At the baghouse configuration, the sampling of flue gas, can be executed in three locations. Two are located upstream of the baghouse and one downstream, with two filtration devices which are located upstream of the baghouse, one at the exit from the backpass (high temperature side) and the second at the exit from the cold temperature side. A third location exists at the exit from the baghouse filters. To withdraw the sample stream, the flue gas is separated from the fly ash using an induced draft blower through a filtration device. The filtration device is a sintered metal filter tube inside a tube to allow for the passage of flue gas across it. The increased velocity of flue gas/fly ash through the inner sintered metal tube results in an inertial separation of the particles from the flue gas. The tube that connects the main pipeline to the filter and the filtration device are heat traced and their temperatures are controlled at the same temperature as the flue gas temperature in the main pipeline where the sample is extracted [^1].

Mercury Sampling System:

Mercury is withdrawn from the filtration device through a mercury speciation train and a conditioner using a sample pump, then pumped through a rotameter and into the mercury analyzer. Sample lines are heat traced from the filtration device to the impinge trains in order to eliminate any source of water condensation. The impinge trains comprise a stannous chloride solution, used to reduce $Hg^+$ and $Hg^{2+}$ to $Hg^0$, which is then passed through a sodium bicarbonate solution to capture any traces of sulfur oxides which interferes with mercury readings. All the solutions in the impinge trains are refreshed pumping fresh solutions with a peristaltic pump and eliminating spent waste solutions. This gas is flown through a chiller which condenses moisture at 35 F, thus, mercury concentrations are reported in a dry basis. Sample lines and equipments starting from the filtration device downstream to the mercury analyzer are teflon or teflon-lined to avoid mercury sorption in the process [^1].

Example 1. Preparation of Tetrabutylammonium Tribromide Deposited on Fly Ash

Preparation of Tetrabutylammonium Tribromide (TBAT) Solution.

Bromine (2.669 g, 16.7 mmol) was added to a large snap-cap, tared vial and diluted with chloroform (9.8 mL) to provide a very dark red solution. Tetrabutylammonium bromide (5.698 g, 17.7 mmol, 1.06 equivalents) was added in portions over a period of roughly ten minutes with periodic mixing. The resulting solution of tetrabutylammonium tribromide (TBAT) was somewhat light orange red, and had 16 mL volume, corresponding to a TBAT concentration of 1.04 M (and 0.06 M excess tetrabutylammonium bromide).

Preparation of the Mercury Removing Composition on a Laboratory Scale, Using Fly Ash as Substrate.

A sample of Powder River Basin coal fly ash (~12 g) obtained from the bag house at the Dry Fork Station power plant (Wyoming) was sieved through a 53 µm sieve. From the resulting sieved fraction, 10 g were deposited in a 25 mL cylindrical glass vial (2.5 cm ID). To this material, a volume (2 mL, 0.208 mmol) of the 0.104M TBAT solution was pipetted directly on top of the material as it was continuously stirred and mixed. Upon addition and mixing, a yellowish, brown paste was formed comprising the fly ash substrate and the 0.104 M TBAT solution. This paste was dried at room temperature and pressure (20° C., ~77.5 kPa) with periodic mixing for 4 hours. Upon drying and light mixing, the sample formed a finely dispersed yellowish powder which was the final 1% wt. TBAT mercury removing composition using fly ash as substrate.

Preparation of the mercury removing composition for the pilot scale evaluations was carried out in a similar fashion, though more chloroform was employed to ease mixing. In these pilot scale preparations, drying was performed by spreading the material on a flat surface:

Preparation of the 1% wt.

TBAT mercury removing composition on a pilot plant scale, using fly ash as substrate. A sample of Powder River Basin coal fly ash obtained from the bag house at the Dry Fork Station power plant (Wyoming) was sieved through a 53 µm sieve. From the resulting sieved fraction, 90 g were extracted and moved into a 695 mL cylindrical glass jar (7.62 cm ID). To this material, a volume (18.1 mL, 1.88 mmol) of the 0.104M TBAT solution was added dispersively on top of the material as it was continuously stirred and mixed. Due to mixing complexities associated with larger samples, an additional volume of 7.3 mL of chloroform was added to wet the sample and yield a more uniform paste. Upon addition and mixing, a yellowish, brown paste was formed comprising the fly ash substrate, the 0.104 M TBAT solution and the additional chloroform. This paste was dried at room temperature and pressure (20° C. and ~77.5 kPa) and extended on a flat surface (~3 mm thick) to allow for rapid drying. The sample was dried for 4 hours. Once dried, the sample formed a finely dispersed yellowish powder which was the final 1% wt. TBAT mercury removing composition using fly ash as substrate.

Due to the small scale of the preparations for laboratory, and even pilot scale preparation of compositions, there may be some degree of non-uniformity in the deposition of TBAT. On a much larger scale, this could likely be improved by, for example, spraying the TBAT solution on FA in a rotating drum, and/or some similar process.

Preparation of Sodium Chloride Modified TBAT/FA Compositions.

A sample of fly ash (~12.7 g) obtained from the Dry Fork Station coal-fired power plant bag house was passed through a 53 µm sieve to give ~11.1 g material. To this sieved FA was added aqueous sodium chloride (9.0 ml of a 1M solution of NaCl) to form a paste and yield a 5% wt loading of NaCl. The paste was dried at 300° C. for 12 hours. The resulting cake was crushed and passed again through the 53µ sieve, providing ~10 grams sodium chloride modified A. This material was then activated as described above by treatment with TBAT (0.201 ml of a 1.04M solution in chloroform) to yield a 1% by weight loading of this material. The sample was then dried at 20° C. for 12 hours.

Preparation of a 3% TBAT/FA Composition by Dry Mixing of Components Followed by Wetting with an Organic Solvent.

In a glass beaker TBAT powder (0.3 g) was added to a raw fly ash (10 g) and both powders were mixed thoroughly. Sufficient chloroform to moisten the powder mixture was then added (~20% by volume) and the mixture stirred to disperse the liquid. Next, the TBAT containing fly ash was dried by dispersing it on a flat surface. The drying or solvent evaporation was achieved by letting the dispersed material rest in a ventilated fume hood for ~15-20 minutes. The dried activated fly ash was lightly crushed to create the final product, 3% TBAT/FA, that had mercury removing characteristics similar to compositions prepared by adding a chloroform solution of TBAT to FA and similarly drying/crushing.

Example 2. In-Flight Test Using a 5% Tetrabutylammonium Tribromide Activated FA

Figure 13:
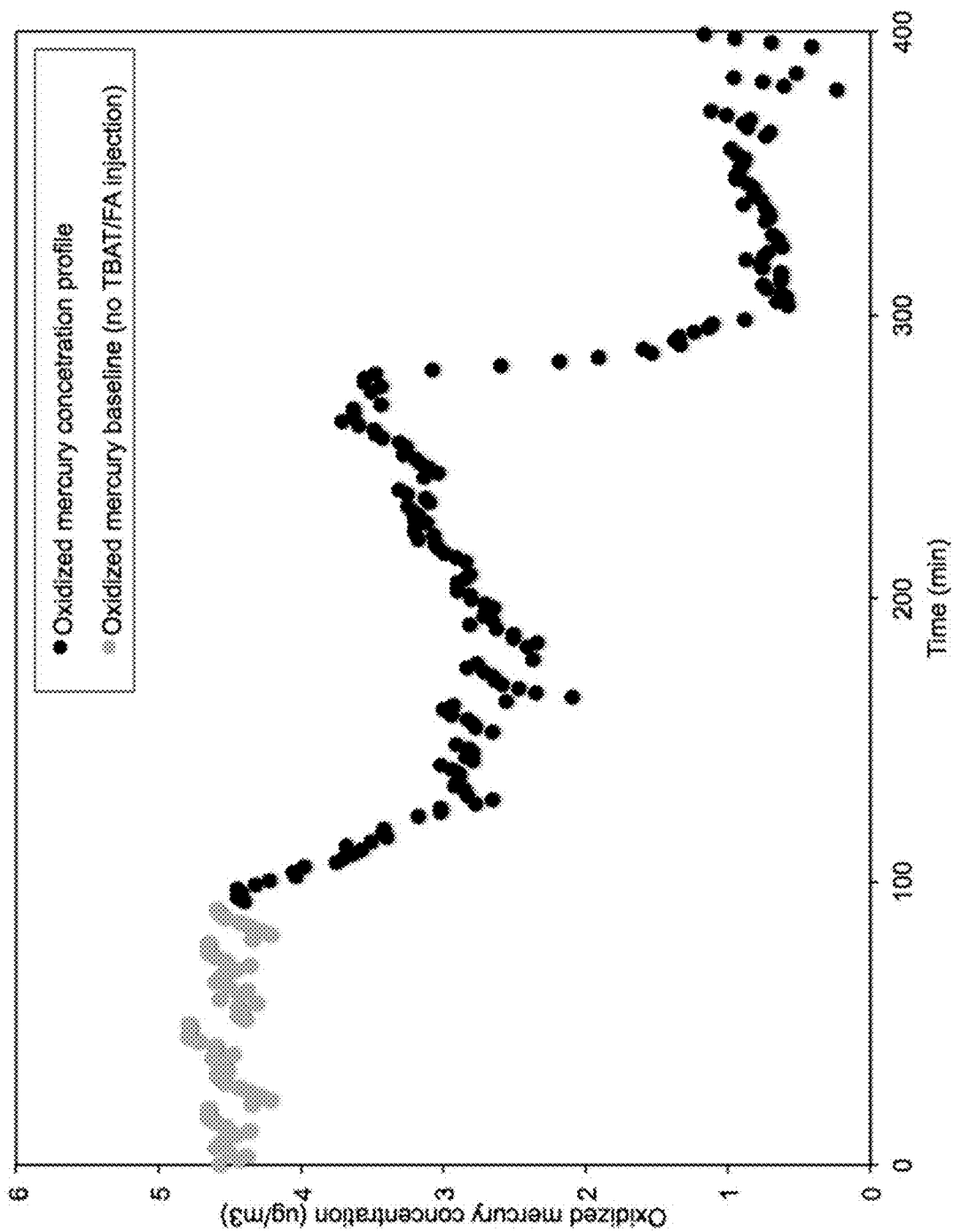
FIG. 13. Oxidized mercury concentration profile for an in-flight test at the Combustion Testing Facility, injecting a 5% TBAT/FA. An oxidized mercury concentration profile is shown for an in-flight test at the Combustion Testing Facility using a 5% TBAT activated FA (FA obtained from Dry Fork Station, refer to preparation steps in example 1). In-flight tests exhibited removal efficiencies of oxidized mercury above 75%, at a rate of 7.4 lb/MMacf.

The use of TBAT/FA for the removal of another contaminant of relevance was demonstrated. Oxidized mercury, in the form of mercury salts with mercury in the +1 and/or +2 oxidation state also represents a health hazard present in flue gases, in addition to elemental mercury. In a number of pilot plant experiments, it was found that in addition to strongly decreasing the levels of elemental mercury, TBAT/FA compositions effected significant reductions in oxidized mercury levels. FIG. 13 shows an oxidized mercury concentration profile for an in-flight test at the Combustion Testing Facility. In this test, a 5% TBAT activated FA was injected in an in-flight test. An oxidized mercury concentration profile is shown in FIG. 13 for an in-flight test at the Combustion Testing Facility using a 5% TBAT activated FA. The FA was obtained from Dry Fork Station, and the TBAT/FA was prepared as described in the preparation steps in EXAMPLE 1. The plot in FIG. 13 shows that in-flight tests exhibited removal efficiencies of oxidized mercury above 75%, at a rate of 7.4 lb/MMacf. Without wishing to be bound by any particular theory, the origin of this reduction of oxidized mercury may have to do simply with the presence of the hydrophobic tetrabutylammonium cation, that might tend to physisorb the mercury salts present.

Example 3. Paramaters for $R_1R_2R_3R_4N^+ X_1X_2X_3^-$ for Removing Hg(0) at Room Temperature Activated carbon (AC) is typically used at high temperatures to remove Hg(0). This is because that at room temperature, the AC is taking up Hg in an adsorptive process, which is an equilibrium, while at high temperatures it appears that there's some complex chemistry in which the AC facilitates oxidation of the Hg; while this is an equilibrium reaction, if there are certain species present on the AC, such as halides ($X^-$), they may drive the equilibrium by forming $HgX_2$. The materials and methods described herein are inherently oxidizing at any temperature, and lead to formation of $HgX_1X_2$, where $X_1$ and $X_2$ may/may not be the halide. The described materials, applied as a coating to a fiber (glass wool, mineral wool), may be better at room temperature or at near room temperature (human-compatible temperatures).

In an oxidizing trihalide $[X_1X_2X_3]^-$ there is the potential equilibrium with $X_1X_2+X_3^-$. Since $X_1X_2$ is typically volatile, the position of this equilibrium may determine the stability (and thus long term effectiveness) of $[X_1X_2X_3]^-$ as the oxidizing trihalide. However, it is likely that the greater the proportion of high atomic weight X, the greater the stability. Thus, $ClBr_2^-$ is less stable than $XBr_2^-$ ($X \neq Cl$, F), which makes $ClBr_2^-$ less desirable for room temperature removal of mercury.

With respect to the R groups in the quaternary ammonium component $R_1R_2R_3R_4N^+$, there are some formulaic limitations due to the desirable physical properties (e.g., with respect to physical state, how easy it would be to apply it to a fiber, etc.), and as to the cost. Issues may also arise with the ability to prepare the compound of the R groups having certain characteristics. For example, if two (or more) of the R groups are branched at the point of attachment (i.e., the carbon to which the N is attached to is secondary or tertiary) then synthesis may be difficult. Having one, or no secondary R groups is desirable, with no secondary R groups being more desirable. Further, additional C atoms will likely increase the total cost of the compound.

Thus, an example compound is $R_1R_2R_3R_4N^+$ in which $R_1$, $R_2$, $R_3$ and $R_4$ are independently alkyl groups of six or fewer carbons, and in which no more than one of these has a structure in which the N of $R_1R_2R_3R_4N^+$ is attached to a carbon that is in turn attached to two carbons:

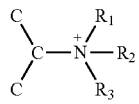

Further, one or more of the R groups may be aromatic or substituted aromatic. In some cases, it may be beneficial to limit the number of aromatic or substituted aromatic groups to less than or equal to 3 R groups, less than or equal to 2 R groups, or optionally, less than or equal to 1 R group. In some cases, R groups may contain heteroatoms. R groups may include cyclic amines.

Figure 14:
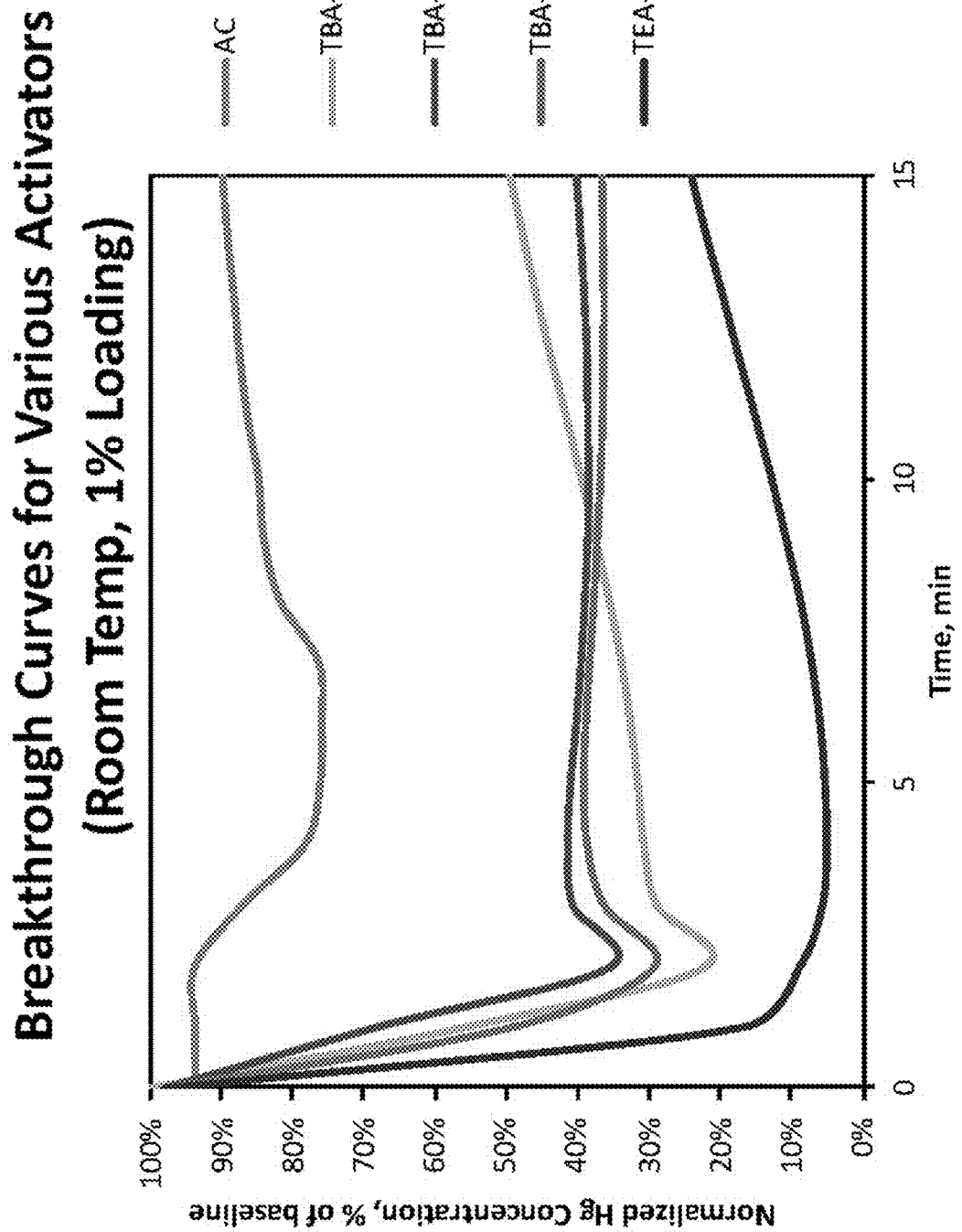
FIG. 14. Breakthrough Curves for various Activators at room temperature (20° C.) comparing Activated Carbon with compounds described herein.
Figure 15:
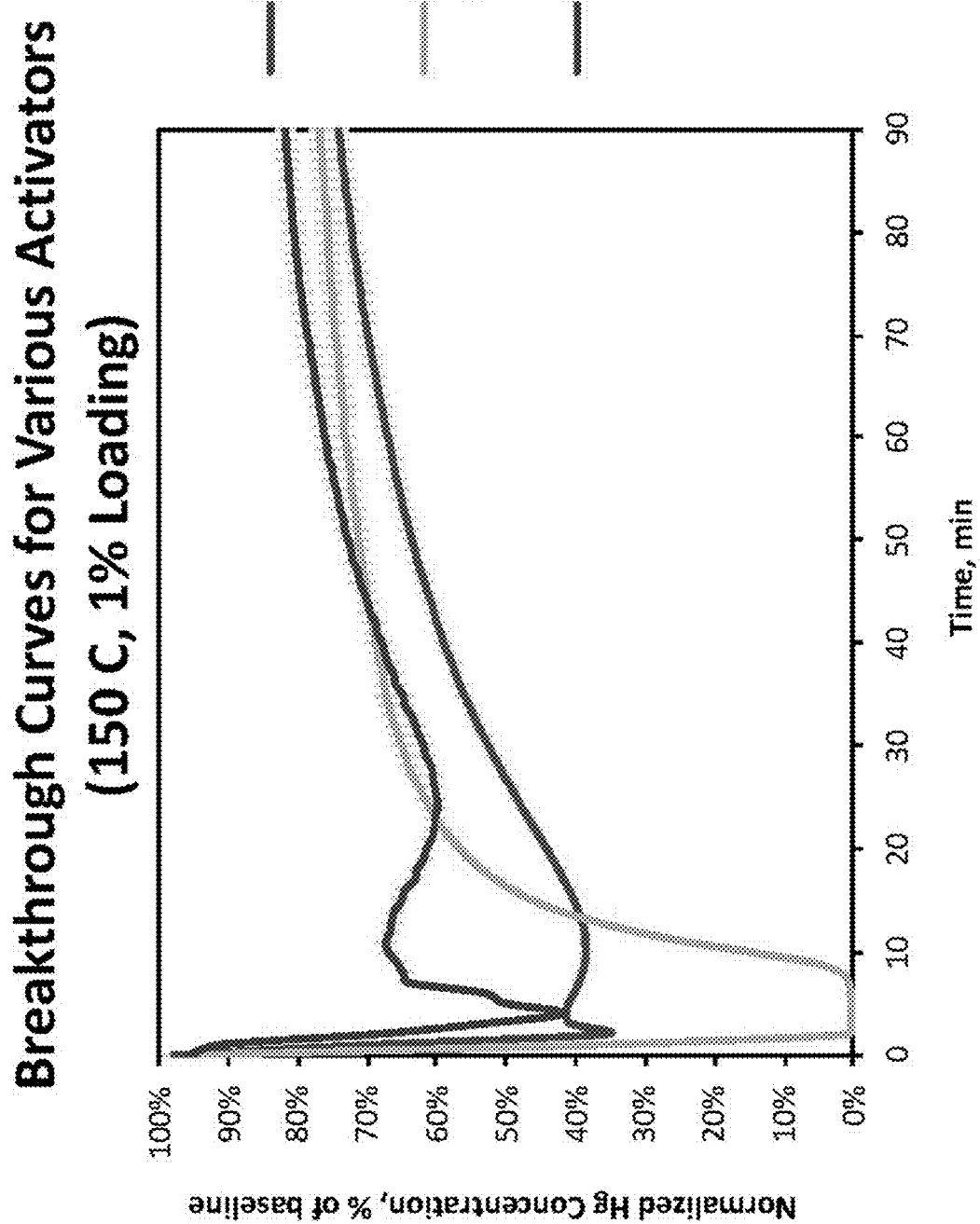
FIG. 15. Breakthrough Curves for various Activators at 150° C. comparing compounds described herein.

Experimental results, as provided in FIGS. 14-15, indicate that [Br—I—I]$^-$ may provide benefits over other trihalide anions. For example, [Br—I—I]$^-$ may be more stable. As another example, [Br—I—I]$^-$ may more efficiently oxidize contaminants at relatively low (e.g. 150° C.) or at room temperatures. Advantageously, oxidation species generated by the reaction of [Br—I—I]$^-$ with contaminants may also have higher stability in comparison with oxidation species generated by other anions.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be clear to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counter ions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The expression "of any of claims XX-YY" (wherein XX and YY refer to claim numbers) is intended to provide a multiple dependent claim in the alternative form, and in some embodiments is interchangeable with the expression "as in any one of claims XX-YY."

REFERENCES

[1] Granite E J, Pennline H W, Hargis R A. Novel sorbents for mercury removal from flue gas. Ind Eng Chem Res 2000; 39:1020-9.
[2] Sasmaz E, Kirchofer A, Jew A D, Saha A, Abram D, Jaramillo T F, et al. Mercury chemistry on brominated activated carbon. Fuel 2012; 99:188-96.
[3] Papirer E, Lacroix R, Donnet J-B, Nanse G, Fioux P. XPS Study of the halogenation of carbon black-part 1. Bromination. Carbon 1994; 32:1341-58.
[4] Papirer E, Lacroix R, Donnet J-B, Nanse G, Fioux P. XPS study of the halogenation of carbon black—Part 2. Chlorination. Carbon 1995; 33:63-72.
[5] Budarin V L, Clark J H, Tavener S J, Wilson K. Chemical reactions of double bonds in activated carbon: microwave and bromination methods. Chem Commun 2004:2736-7.
[6] Vidic R D, Siler D P. Vapor-phase elemental mercury adsorption by activated carbon impregnated with chloride and chelating agents. Carbon 2001; 39:3-14.
[7] Varma R S, Ju Y, Sikdar S, Lee J Y. compositions and methods for removing mercury from mercury-containing fluids. U.S. Pat. No. 7,858,061, 2010.

We claim:

1. A process for removal of contaminants in a fluid, said process comprising the steps of:
    contacting said contaminants in said fluid with a trihalide salt provided on an ash substrate or a fiber substrate;
    wherein said trihalide salt comprises an oxidizing trihalide anion and cationic nitrogen counter ion;
    wherein said trihalide anion has the formula [Br—Br—Br]$^-$, [Br—Br—Cl]$^-$, [Br—Br—I]$^-$; or [Br—I—I]$^-$; and
    wherein the trihalide anion oxidizes said contaminants, thereby generating one or more reaction products resulting in removal of said contaminants in said fluid; and
    wherein said substrate is a fiber substrate and fibers of said fiber substrate have a cross sectional dimension selected over the range of 0.1 μm to 100 μm.

2. The process of claim 1, wherein said one or more reaction products are oxidation products.

3. The process of claim 2, wherein said one or more oxidation products comprise $Hg^{2-}$ and/or $Hg^{1+}$.

4. The process of claim 3, further comprising a step of removing said $Hg^{2+}$ and/or $Hg^{1+}$ oxidation products and contaminants from said substrate by treatment of said substrate with an organic solvent or halogenated hydrocarbon solvent.

5. The process of claim 1, wherein said one or more reaction products are deposited on said substrate.

6. The process of claim 1, wherein said cationic nitrogen counter ion is an ammonium cation.

7. The process of claim 6, wherein said ammonium cation is a quarternary alkylammonium cation.

8. The process of claim 1, wherein said cationic nitrogen counter ion has the formula (FX2) or (FX3):

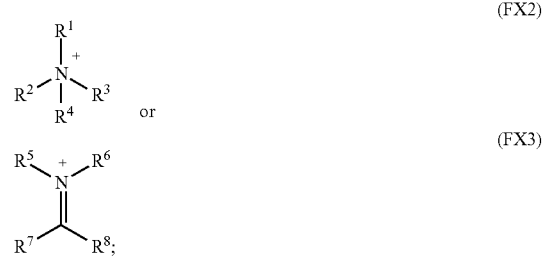

wherein each of $R^1$, $R^2$, $R^3$, $R^4$, $R^5$, $R^6$, $R^7$ and $R^8$ is independently hydrogen, $C_1$-$C_{20}$ alkyl, $C_3$-$C_{20}$ cycloalkyl, $C_5$-$C_{30}$ aryl, $C_5$-$C_{30}$ heteroaryl, $C_5$-$C_{20}$ alkylaryl or $C_5$-$C_{20}$ arylalkyl, or wherein any of $R^1$, $R^2$, $R^3$, $R^4$, $R^5$, $R^6$, $R^7$, or $R^8$ together with the atoms to which they are attached combine to form one or more carbocyclic or heterocyclic 4, 5, 6, 7, 8 or 9 membered rings.

9. The process of claim 1, wherein said cationic nitrogen counter ion has the formula (FX4):

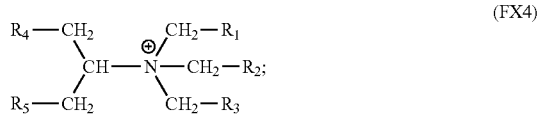

(FX4)

wherein each wherein each of $R^1$, $R^2$, $R^3$, $R^4$ and $R^5$ is independently hydrogen, $C_1$-$C_{20}$ alkyl or $C_3$-$C_{20}$ cycloalkyl.

10. The process of claim 9, wherein each of $R^1$, $R^2$, $R^3$ is independently hydrogen or a $C_1$-$C_5$ alkyl; and
each of $R^4$ and $R^5$ is independently hydrogen or a $C_1$-$C_4$ alkyl.

11. The process of claim 1, wherein said trihalide salt is sorbed on a surface of said substrate.

12. The process of claim 1, wherein said fibers have a length in the range of 0.9 μm to 50 cm.

13. The process of claim 1, wherein said substrate contains less than 69% carbon by mass.

14. The process of claim 1, wherein said process is carried out at a temperature selected from 273 K to 473 K.

15. The process of claim 1, wherein said contacting step comprises injecting or blowing said trihalide salt provided on said substrate into said fluid or blowing said trihalide salt provided on said substrate into said fluid.

16. The process of claim 1, wherein said substrate comprises a substrate that has additionally been modified by deposition of a halide salt, said halide salt being chosen from fluoride, chloride, bromide or iodide combined with a counterion chosen from lithium, sodium, potassium, calcium, or ammonium or quaternary ammonium.

17. The process of claim 1, wherein said oxidizing trihalide anion has the formula [Br—I—I]$^-$.

18. A process for producing a material for the removal of mercury from a gas, said process comprising the steps of:
providing a substrate; and
contacting said substrate with a trihalide salt comprising an oxidizing trihalide anion having the formula [Br—Br—Br]$^-$, [Br—Br—Cl]$^-$, [Br—Br—I]$^-$, or [Br—I—I]$^-$ and cationic nitrogen counter ion; wherein said trihalide anion oxidizes said mercury; and
wherein said substrate is a fiber substrate.

19. A process for removal of contaminants in a fluid, said process comprising the steps of:
contacting said contaminants in said fluid with a trihalide salt provided on a fiber substrate;
wherein said trihalide salt comprises an oxidizing trihalide anion and cationic nitrogen counter ion;
wherein said trihalide anion has the formula [Br—I—I]$^-$; and
wherein the trihalide anion oxidizes said contaminants, thereby generating one or more reaction products resulting in removal of said contaminants in said fluid.

* * * * *